(12) United States Patent
Wiener

(10) Patent No.: US 10,944,545 B2
(45) Date of Patent: Mar. 9, 2021

(54) OBFUSCATED PERFORMANCE OF A PREDETERMINED FUNCTION

(71) Applicant: Irdeto B.V., Hoofddorp (NL)

(72) Inventor: Michael Wiener, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 185 days.

(21) Appl. No.: 15/300,525

(22) PCT Filed: Mar. 31, 2014

(86) PCT No.: PCT/EP2014/056421
§ 371 (c)(1),
(2) Date: Sep. 29, 2016

(87) PCT Pub. No.: WO2015/149827
PCT Pub. Date: Oct. 8, 2015

(65) Prior Publication Data
US 2017/0126398 A1    May 4, 2017

(51) Int. Cl.
*H04L 29/06* (2006.01)
*H04L 9/06* (2006.01)

(52) U.S. Cl.
CPC ........ *H04L 9/0631* (2013.01); *H04L 2209/16* (2013.01)

(58) Field of Classification Search
CPC .................. H04L 2209/16; H04L 9/0631
See application file for complete search history.

(56) References Cited

U.S. PATENT DOCUMENTS

| 6,594,761 B1 * | 7/2003 | Chow ................... G06F 21/14 713/189 |
| 6,779,114 B1 * | 8/2004 | Chow ................... G06F 21/14 713/189 |

(Continued)

FOREIGN PATENT DOCUMENTS

| CN | 101401348 A | 4/2009 |
| CN | 102016871 A | 4/2011 |

(Continued)

OTHER PUBLICATIONS

International Search Report and Written Opinion cited in corresponding International Application No. PCT/EP2014/056421 dated Dec. 2, 2014.

(Continued)

*Primary Examiner* — Beemnet W Dada
*Assistant Examiner* — Ka Shan Choy
(74) *Attorney, Agent, or Firm* — Rimon PC; Marc Kaufman

(57) ABSTRACT

A method of obfuscated performance of a predetermined function, wherein for the predetermined function there is a corresponding plurality of first functions so that, for a set of inputs for the function, a corresponding set of outputs may be generated by (a) representing the set of inputs as a corresponding set of values, wherein each value comprises at least part of each input of a corresponding plurality of the inputs, (b) generating a set of one or more results from the set of values, where each result is generated by applying a corresponding first function to a corresponding set of one or more values in the set of values, and (c) forming each output as either a part of a corresponding one of the results or as a combination of at least part of each result of a corresponding plurality of the results; wherein the method comprises: obtaining, for each value in the set of values, one or more corresponding transformed versions of said value, wherein a (Continued)

transformed version of said value is the result of applying a bijection, that corresponds to said transformed version, to said value; and generating a set of transformed results corresponding to the set of results, wherein each transformed result corresponds to a respective result and is generated by applying a second function, that corresponds to the first function that corresponds to the respective result, to a transformed version of the one or more values of the respective set of one or more values for the corresponding first function.

14 Claims, 8 Drawing Sheets

(56) References Cited

U.S. PATENT DOCUMENTS

| | | | |
|---|---|---|---|
| 6,842,862 B2 | 1/2005 | Chow et al. | |
| 7,350,085 B2 | 3/2008 | Johnson et al. | |
| 7,397,916 B2 | 7/2008 | Johnson et al. | |
| 8,543,835 B2* | 9/2013 | Michiels | H04L 9/06 713/189 |
| 8,700,915 B2* | 4/2014 | Michiels | H04L 9/002 713/189 |
| 2003/0163718 A1* | 8/2003 | Johnson | G06F 21/79 713/193 |
| 2003/0221121 A1 | 11/2003 | Chow et al. | |
| 2004/0139340 A1* | 7/2004 | Johnson | G09C 1/00 713/194 |
| 2012/0002807 A1* | 1/2012 | Michiels | H04L 9/0631 380/28 |
| 2012/0093313 A1* | 4/2012 | Michiels | G09C 1/00 380/255 |

FOREIGN PATENT DOCUMENTS

| | | |
|---|---|---|
| CN | 103004130 A | 3/2013 |
| CN | 103559458 A | 2/2014 |
| WO | 2009140774 A1 | 11/2009 |
| WO | 2014/154271 A1 | 2/2014 |
| WO | 2015/149827 A1 | 10/2015 |

OTHER PUBLICATIONS

Chow S et al: "White-box cryptography and an AES implementation", Jan. 1, 2003; 20030000, Jan. 1, 2003 (Jan. 1, 2003), pp. 250-270, XP002462505.
James A Muir: "A Tutorial on White-box AES",International Association for Cryptologic Research vol. 20130228: 053134, Feb. 28, 2013 (Feb. 28, 2013), pp. 1-25, XP061007352.
Chow S et al: "A white-box DES implementation for DRM applications", Jan. 1, 2003; 20030000, Jan. 1, 2003 (Jan. 1, 2003), pp. 1-15, XP002462504.
Plasmans M: "White-Box Cryptography for Digital Content Protection", Internet Citation, May 2005 (May 2005), XP003019136, Retrieved from the Internet: URL:http://www.alexandria.tue.nl/extral/afstversl/wsk-i.plasmans2005.pdf [retrieved on Jan. 1, 2007].
International Preliminary Report on Patentability issued in PCT Application No. PCT/EP2014/056421, dated Oct. 13, 2016, 8 pages.
Wikipedia, "Bijection", website: https://en.wikipedia.org/w/index.php?title=Bijection&oldid=601397690, obtained on Jan. 12, 2016, 6 pages.
Wikipedia, "Bit slicing", website: https://en.wikipedia.org/w/index.php?title=Bit_slicing&oldid=590022783, obtained on Jan. 12, 2016, 3 pages.
Wikipedia, "Central processing unit", website: https://en.wikipedia.org/w/index.php?title=Central_processing_unit&oldid=600744248, obtained on Jan. 12, 2016, 15 pages.
Wikipedia, "Circuit minimization for Boolean functions", website: https://en.wikipedia.org/w/index.php?title=Circuit_minimization_for_Boolean_functi . . . obtained on Jan. 12, 2016, 3 pages.
Wikipedia, "Espresso heuristic logic minimizer", website: https://en.wikipedia.org/w/index.php?title=Espresso_heuristic_logic_minimizer&oldi . . . , obtained on Jan. 12, 2016, 4 pages.
Wikipedia, "Finite impulse response", website: https://en.wikipedia.org/w/index.php?title=Finite_impulse_response&oldid=601145459, obtained on Jan. 12, 2016, 6 pages.
Wikipedia, "Functional completeness", website: https://en.wikipedia.org/w/index.php?title=Functional_completeness&oldid=579647479, obtained on Jan. 12, 2016, 5 pages.
Wikipedia, "Karnaugh map", website: https://en.wikipedia.org/w/index.php?title=Karnaugh_map&oldid=601618348, obtained on Jan. 12, 2016, 8 pages.
Wikipedia, "Lookup table", website: https://en.wikipedia.org/w/index.php?title=Lookup_table&oldid=598220793, obtained on Jan. 12, 2016, 8 pages.
Wikipedia, "Bitslice DES", website: https://web.archive.org/web/20131021232909/http://www.darkside.com.au/bitslice/, obtained on Sep. 8, 2017, 2 pages.
Wikipedia, "Graphics processing unit" website: https://en.wikipedia.org/w/index.php?title=Graphics_processing_unit&oldid=601713 . . . , obtained on Jan. 12, 2016, 10 pages.
Wikipedia, "SWAR" website: https://en.wikipedia.org/w/index.php?title=SWAR&oldid=600625450, obtained on Jan. 12, 2016, 3 pages.
Chinese First Office Action for Chinese Application No. 201480079433.9, dated Dec. 3, 2018, 7 pages.

* cited by examiner

| 0 | $x_1$ | 0 | $x_2$ | 0 | $x_3$ | $p_1$ |
| 0 | $x_2$ | 0 | $x_3$ | 0 | $x_4$ | $p_2$ |
| 0 | $x_3$ | 0 | $x_4$ | 0 | $x_5$ | $p_3$ |

| $y_3$ | $y_4$ | $y_5$ | $q_1$ |

FIGURE 7a

| 0 | $x_1$ | 0 | $x_3$ | 0 | $x_5$ | $p_1$ |
| 0 | $x_2$ | 0 | $x_4$ | 0 | $x_6$ | $p_2$ |
| 0 | $x_3$ | 0 | $x_5$ | 0 | $x_7$ | $p_3$ |
| 0 | $x_4$ | 0 | $x_6$ | 0 | $x_8$ | $p_4$ |

| $y_3$ | $y_5$ | $y_7$ | $q_1$ |
| $y_4$ | $y_6$ | $y_8$ | $q_2$ |

FIGURE 7b

OBFUSCATED PERFORMANCE OF A PREDETERMINED FUNCTION

The present application is the United States national stage of International Application No. PCT/EP2014/056421, filed Mar. 31, 2014, the entire content of which is incorporated herein by reference.

FIELD OF THE INVENTION

The present invention relates to a method of obfuscated performance of a predetermined function and a method of configuring a processor to implement a predetermined function in an obfuscated manner, and apparatus and computer programs for carrying out such methods.

BACKGROUND OF THE INVENTION

A "white box environment" is an execution environment in which a person can execute an amount of computer code (or software)—where the code implements a function F—and the person may inspect and modify the code (or be assumed to know the underlying algorithm that is being implemented) and/or, during execution of the code, the person may inspect and modify the values of data being used (i.e. the contents of the memory being used), the data flow and the process flow (or order of execution of instructions in the code).

Various techniques are known that enable provision or generation of code (that implements the function F) such that, even if the code is executed in a white-box environment, the person executing the code cannot determine the values of inputs to the function F and/or outputs of the function F and/or secret information used by the function F (or, at the very least, such a determination is rendered impractical or infeasible within a given amount of time).

It would be desirable to be able to provide an improved technique for providing or generating code that is suitable for deployment or execution within a white-box environment.

SUMMARY OF THE INVENTION

According to a first aspect of the invention, there is provided a method of obfuscated performance of a predetermined function, wherein for the predetermined function there is one or more corresponding first functions so that, for a set of inputs for the function, a corresponding set of outputs may be generated by (a) representing the set of inputs as a corresponding set of values, wherein each value comprises at least part of each input of a corresponding plurality of the inputs, (b) generating a set of one or more results from the set of values, where each result is generated by applying a corresponding first function to a corresponding set of one or more values in the set of values, and (c) forming each output as either a part of a corresponding one of the results or as a combination of at least part of each result of a corresponding plurality of the results; wherein the method comprises: obtaining, for each value in the set of values, one or more corresponding transformed versions of said value, wherein each transformed version of said value is the result of applying a respective bijection, that corresponds to said transformed version, to said value; and generating a set of transformed results corresponding to the set of results, wherein each transformed result corresponds to a respective result and is generated by applying a respective second function, that corresponds to the first function that corresponds to the respective result, to a transformed version of the one or more values in the set of one or more values corresponding to the first function, wherein, for the respective second function, there is a corresponding bijection for obtaining the respective result from said transformed result.

In some embodiments, said obtaining comprises: obtaining the set of values; and generating, for each value in the obtained set of values, said one or more corresponding transformed versions of said value, wherein each of said one or more corresponding transformed versions of said value is generated by applying said respective bijection, that corresponds to said transformed version, to said value. Obtaining the set of values may then comprise: obtaining the set of inputs; and generating the set of values from the set of inputs.

In some embodiments, said obtaining comprises receiving, at a first module that performs said obtaining and said generating, said one or more transformed versions of each value in said set of values from a second module.

In some embodiments, the method comprises: generating the set of results from the set of transformed results by applying, to each transformed result, the bijection that corresponds to the second function for that transformed result. The method may then comprise obtaining the set of outputs from the set of results.

In some embodiments, the method comprises outputting the set of transformed results, from a first module that performs said obtaining and said generating to a second module.

In some embodiments, for each value in the set of values, the at least part of each input of a corresponding plurality of the inputs comprises the whole of each input of the corresponding plurality of inputs.

In some embodiments, for each value in the set of values, the at least part of each input of a corresponding plurality of the inputs comprises a predetermined number of bits of each input of the corresponding plurality of inputs. The predetermined number may be 1.

In some embodiments, the predetermined function corresponds to a lookup table that maps an input in the set of inputs to a corresponding output in the set of outputs.

According to a second aspect of the invention, there is provided a method of configuring a processor to implement a predetermined function in an obfuscated manner, wherein for the predetermined function there is one or more corresponding first functions so that, for a set of inputs for the function, a corresponding set of outputs may be generated by (a) representing the set of inputs as a corresponding set of values, wherein each value comprises at least part of each input of a corresponding plurality of the inputs, (b) generating a set of one or more results from the set of values, where each result is generated by applying a corresponding first function to a corresponding set of one or more values in the set of values, and (c) forming each output as either a part of a corresponding one of the results or as a combination of at least part of each result of a corresponding plurality of the results; wherein the method comprises: for each first function: specifying, for each value in the corresponding set of one or more values for the first function, a corresponding bijection; specifying a bijection for the first function; and based on the specified bijections, determining a second function that corresponds to the first function, wherein the second function, upon application to the one or more values of the respective set of one or more values for the first function when transformed under their corresponding bijections, outputs a transformed version, under the bijection for the first function, of the result corresponding to the first function; and configuring the processor to carry out the method of the above first aspect of the invention, using the determined section functions.

According to a third aspect of the invention, there is provided an apparatus arranged to carry out any one of the above methods.

According to a fourth aspect of the invention, there is provided a computer program which, when executed by a processor, causes the processor to carry out any one of the above methods. The computer program may be stored on a computer-readable medium.

BRIEF DESCRIPTION OF THE DRAWINGS

Embodiments of the invention will now be described, by way of example only, with reference to the accompanying drawings, in which:

FIGS. 7a and 7b schematically illustrate how the method of FIG. 3 can be applied when the function F is a finite impulse response filter.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System Overview

Figure 1:
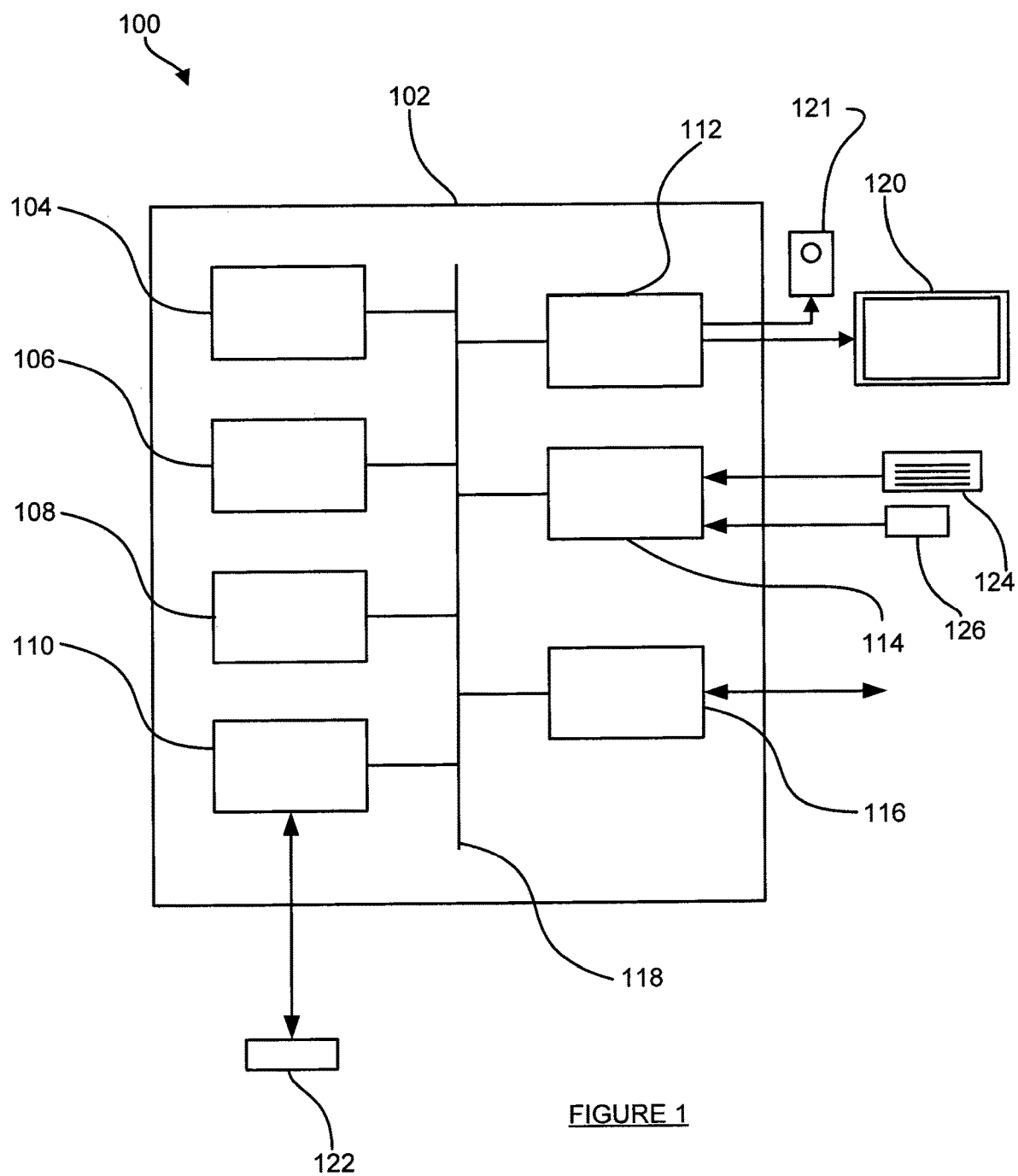
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a smartcard; a games console; other mobile devices or consumer electronics devices; etc.

2—Implementation, and Performance, of a Predetermined Function

As will be described in more detail below, embodiments of the invention involve, or relate to, a predetermined function F. The function F may be any function (or operation or procedure or mapping or calculation or algorithm) that is arranged to operate on (or process) one or more inputs to generate a corresponding output. Some specific examples of the function F are provided later, but it will be appreciated that embodiments of the invention are not limited to the specific examples discussed below.

As shall be described in more detail below, the function F is a function for which one or more corresponding functions (referred to herein as "sub-functions" for ease of reference) $F_1, \ldots, F_N$ can be defined so that, for a set of inputs $\{x_1, \ldots, x_W\}$ for the function F, a set of outputs $\{y_1, \ldots, y_V\}$ from the function F that corresponds to the set of inputs $\{x_1, \ldots, x_W\}$ may be generated by:

(a) representing the set of inputs $\{x_1, \ldots, x_W\}$ as a corresponding set of values $\{p_1, \ldots, p_M\}$, wherein each value $p_j$ (j=1, ..., M) comprises at least part of each input of a corresponding plurality of the inputs;

(b) generating a set of one or more results $\{q_1, \ldots, q_N\}$ from the set of values $\{p_1, \ldots, p_M\}$, by applying each sub-function $F_j$ (j=1, ..., N) to a corresponding set of one or more values in the set of values $\{p_1, \ldots, p_M\}$ to generate a respective result $q_j$; and (c) forming each output $y_i$ as either a part of a corresponding one of the results or as a combination of at least part of each result of a corresponding plurality of the results.

Thus, in the description below, the following terminology is used:

$x_i$: An input for the function F and, in particular, the $i^{th}$ input in a set of inputs $\{x_1, \ldots, x_W\}$.

W: The number of inputs for the function F to be processed together according to embodiments of the invention. W is an integer greater than 1.

$y_i$: An output from the function F and, in particular, the $i^{th}$ output in a set of outputs $\{y_1, \ldots, y_V\}$ from the function F that corresponds to the set of inputs $\{x_1, \ldots, x_W\}$.

V: The number of outputs from the function F that correspond to the set of inputs $\{x_1, \ldots, x_W\}$ for the function F. V is an integer greater than or equal to 1.

$p_j$: A value generated from the set of inputs $\{x_1, \ldots, x_W\}$ for the function F and, in particular, the $j^{th}$ value in a set of values $\{p_1, \ldots, p_M\}$ generated from the set of inputs $\{x_1, \ldots, x_W\}$.

M: The number of values generated from the set of inputs $\{x_1, \ldots, x_W\}$ for the function F. M is an integer greater than 1.

$q_j$: A result generated from one or more values in the set of values $\{p_1, \ldots, p_M\}$ via a corresponding sub-function $F_j$ and, in particular, the $j^{th}$ result in a set of results $\{q_1, \ldots, q_N\}$.

N: The number of results generated from the set of values $\{p_1, \ldots, p_M\}$. N is an integer greater than or equal to 1.

$F_j$: The sub-function used to generate the $j^{th}$ result $q_j$. Whilst the term "sub-function" is used herein, it will be appreciated that $F_j$ is a function in its own right and is not necessarily a subroutine or a specific part of the predetermined function F.

In some embodiments, V=W, and $y_i=F(x_i)$ for i=1, ..., W. In other embodiments, the function F is arranged to process a number of inputs together to form a single output. As one example, the function F may have three input parameters (or operands), so that $y_1=F(x_1, x_2, x_3)$, $y_2=F(x_4, x_5, x_6)$, $y_3=F(x_7, x_8, x_9)$, ..., in which case V=W/3; as another example, the function F may have two input parameters (or operands), so that $y_1=F(x_1, x_2)$, $y_2=F(x_2, x_3)$, $y_3=F(x_3, x_4)$, ..., in which case V=W−1. It will be appreciated that other relationships between the outputs $y_i$ and the inputs $x_i$ (and, therefore, other relationships between W and V) exist and embodiments of the invention are not limited to any specific relationships.

In some embodiments, the operation/processing performed for the function F is the same regardless of which input(s) $x_i$ is provided to the function F. For example, in the exemplary function above in which $y_i=F(x_i)$ for i=1, ..., W, the output $y_i$ may be calculated based on $x_i$ independent of the index i—i.e. for $1 \leq i < k \leq W$, $y_i=F(x_i)=F(x_j)=y_j$ if $x_i=x_j$. Similarly, in the exemplary function above in which $y_1=F(x_1, x_2)$, $y_2=F(x_2, x_3)$, $y_3=F(x_3, x_4)$, ..., the output $y_i$ may be calculated based on $x_i$ and $x_{i+1}$ independent of the index i—i.e. for $1 \leq i < k < W$, $y_i=F(x_i, x_{i+1})=F(x_j, x_{j+1})=y_j$ if $x_i=x_j$ and $x_{i+1}=x_{j+1}$. However, in other embodiments, the operation/processing performed for the function F may be different depending on which input(s) $x_i$ is provided to the function F. This may be viewed as the operation/processing performed for the function F being dependent on the index i. For example the function F may be defined as $y_i=F(x_i)=x_i+i$ for i=1, ..., W. Similarly, the function F may be defined as $y_i=F(x_i, x_{i+1})=ix_i-3+(x_{i+1}+i)/2$. Similarly, the function F may be defined as $y_i=F(x_i, x_{i+1})=M_i x_i + M_{i+1} x_{i+1}$ where $M_i$ and $M_{i+1}$ are matrices for multiplication with input vectors $x_i$ and $x_{i+1}$. Other examples of such functions are, of course, possible.

As shall be described later, all computer-implemented functions F can be implemented in the manner set out above, so that embodiments of the invention are applicable to all predetermined computer-implemented functions F.

Figure 2:
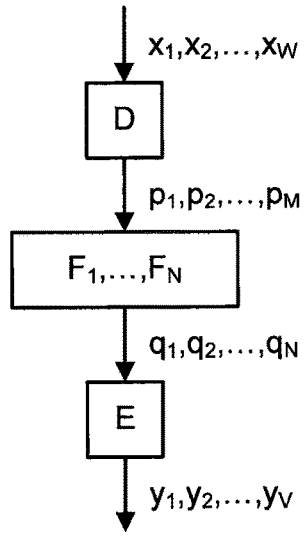
FIG. 2 schematically illustrates functions or operations involved in, and the flow of data for, the performance of a function F when carrying out the method of FIG. 3.
Figure 3:
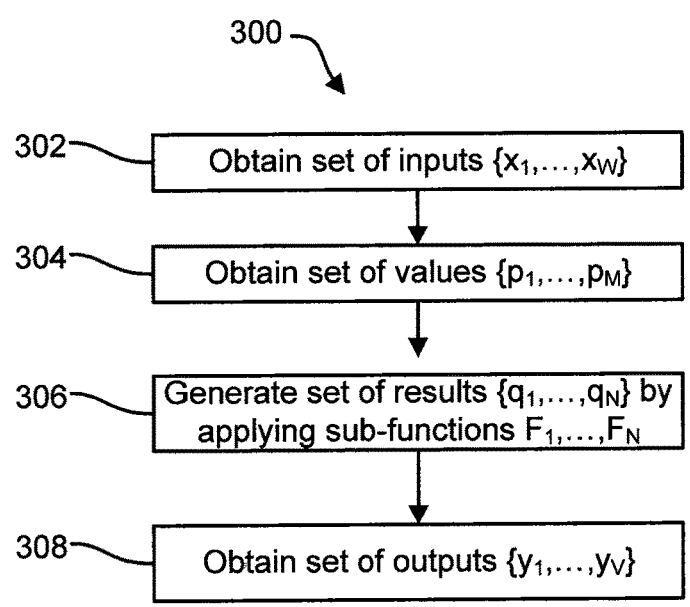
FIG. 3 is a flowchart illustrating a method for performance of the function F.

Embodiments of the invention are described below now with reference to FIGS. 2 and 3. FIG. 3 is a flowchart illustrating a method 300 for performance of the function F, and FIG. 2 schematically illustrates functions or operations involved in, and the flow of data for, the performance of the function F when carrying out the method 300.

The method 300 begins at a step 302, at which a set of inputs $\{x_1, x_2, \ldots, x_W\}$ is obtained. The set of inputs $\{x_1, x_2, \ldots, x_W\}$ may be obtained, at least in part, by receiving one or more of the inputs for the set of inputs $\{x_1, x_2, \ldots, x_W\}$—for example, a first module that is implementing the step 302 may have one or more of the inputs $x_i$ for the set of inputs $\{x_1, x_2, \ldots, x_W\}$ provided to it from a second module as inputs to the first module. Additionally or alternatively, the set of inputs $\{x_1, x_2, \ldots, x_W\}$ may be obtained, at least in part, by accessing or retrieving one or more of the inputs for the set of inputs $\{x_1, x_2, \ldots, x_W\}$—for example, a module that is implementing the step 302 may access or read one or more of the inputs $x_i$ from a memory (such as the memory 106). Thus, the term "obtain" as used herein shall be taken to mean "receive" (or "have provided" in a "passive" way) or "access" (or "retrieve" or "read" in more of an "active" way) or a combination of both receiving and accessing.

For the set of inputs $\{x_1, x_2, \ldots, x_W\}$, W is an integer greater than 1—thus, a plurality of inputs $x_1, x_2, \ldots, x_W$ is obtained.

One or more of the inputs $x_1, x_2, \ldots, x_W$ may be obtained separately (for example, the inputs $x_1, x_2, \ldots, x_W$ may be obtained one at a time, so that, for example, input $x_{i+1}$ is obtained after input $x_i$ for $i=1, \ldots, W-1$). Additionally or alternatively, two or more of the inputs $x_1, x_2, \ldots, x_W$ may be obtained together as a group (for example, the inputs $x_1, x_2, \ldots, x_W$ may be obtained as a single amount of data comprising the whole set $\{x_1, x_2, \ldots, x_W\}$, for example by accessing or reading a block of memory that is storing the plurality of inputs $x_1, x_2, \ldots, x_W$). It will be appreciated that the inputs $x_1, x_2, \ldots, x_W$ may be obtained in other ways/groupings.

Each input $x_1, x_2, \ldots, x_W$ is a value (or quantity or data element or operand) that is a suitable operand or parameter for the function F. For example, if the function F is to process K-bit integers, then each of the inputs $x_1, x_2, \ldots, x_W$ is a K-bit integer.

The set of inputs $\{x_1, x_2, \ldots, x_W\}$ will be processed together, so that a corresponding set of outputs $\{y_1, y_2, \ldots, y_V\}$ can be obtained (or determined or calculated), as will become apparent from the description below. Here, the number of outputs, V, generated from the set of inputs $\{x_1, x_2, \ldots, x_W\}$ is an integer greater than or equal to 1. In some embodiments, V=W; in other embodiments, V≠W.

As used herein, the term "set" means a group or collection of elements in a particular order for example, the set $\{x_1, x_2, x_3, x_4, \ldots, x_W\}$ is different from the set $\{x_2, x_1, x_3, x_4, \ldots, x_W\}$ if $x_1$ is different from $x_2$. Thus, a set (as used herein) may be viewed as a vector or sequence or list or array of elements, i.e. the elements of the set are in particular order (the order being represented by the index/subscript).

Next, at a step 304, a set of values $\{p_1, \ldots, p_M\}$ is generated from the set of inputs $\{x_1, \ldots, x_W\}$. Here, M is an integer greater than 1, so that a plurality of values $p_1, \ldots, p_M$ is generated from the set of inputs $\{x_1, \ldots, x_W\}$.

At the step 304, the set of values $\{p_1, \ldots, p_M\}$ is generated according to $\{p_1, \ldots, p_M\} = D(\{x_1, \ldots, x_W\})$, where D is an invertible function that maps a set of W inputs $x_i$ to a set of M values. Herein, the function D shall be referred to as the "distribution function". In particular, the function D is a predetermined function that has the property that each value $p_j$ ($j=1, \ldots, M$) comprises at least part of each input of a corresponding plurality of the inputs. Put another way, for each value $p_j$ ($j=1, \ldots, M$), there is a corresponding set of $m_j$ distinct indices $\{\alpha_{j,1}, \ldots, \alpha_{j,m_j}\}$ (where $1 \leq \alpha_{j,k} \leq W$ for $1 \leq k \leq m_j$ and where $m_j > 1$) such that $p_j$ comprises at least part of each of $$x_{\alpha_{j,1}}, \ldots, x_{\alpha_{j,m_j}}.$$

Thus, $$p_j = D_j(x_{\alpha_{j,1}}, \ldots, x_{\alpha_{j,m_j}})$$

for a function $D_j$ that corresponds to (or defines, at least in part) the distribution function D. For value $p_j$ ($j=1, \ldots, M$), the at least part of the $k^{th}$ input that belongs to the corresponding set of $m_j$ inputs (i.e. input $x_{\alpha_{j,k}}$) shall be denoted as part $S_{j,k}$ ($1 \leq k \leq m_j$). This is described in more detail below.

For each value $p_j$ ($j=1, \ldots, M$), the corresponding plurality of inputs $$x_{\alpha_{j,1}}, \ldots, x_{\alpha_{j,m_j}}$$

may be any 2 or more of the inputs $x_1, \ldots, x_W$ and, in particular, the corresponding plurality of the inputs may be all of the set of inputs $\{x_1, \ldots, x_W\}$ (so that $m_j=W$) or a proper subset of the set of inputs $\{x_1, \ldots, x_W\}$ (so that $m_j<W$). The number $m_j$ of inputs in the corresponding plurality of inputs may differ between values $p_j$. Thus, in some embodiments, $m_{j_1}=m_{j_2}$ for all $1 \leq j_1 < j_2 \leq M$; in other embodiments, there are indices $j_1$ and $j_2$ for which $m_{j_1} \neq m_{j_2}$.

For each value $p_j$ ($j=1, \ldots, M$), the part $S_{j,k}$ of the $k^{th}$ input that belongs to the corresponding set of $m_j$ inputs (i.e. of input $x_{\alpha_{j,k}}$) may be any part of that input $x_{\alpha_{j,k}}$ and, in particular, may be all of that input $x_{\alpha_{j,k}}$ or a part of that input $x_{\alpha_{j,k}}$ (e.g. one bit or a plurality of bits, which may or may not be adjacent in the bit-representation of that input $x_{\alpha_{j,k}}$). Additionally, the parts $S_{j,k_1}$ and $S_{j,k_2}$ of the $k_1^{th}$ and $k_2^{th}$ inputs respectively that belong to the corresponding set of $m_j$ inputs (i.e. of inputs $$x_{\alpha_{j,k_1}} \text{ and } x_{\alpha_{j,k_2}})$$

may be defined as the same parts of their respective inputs, or may be different parts of their respective inputs.

Figure 4:
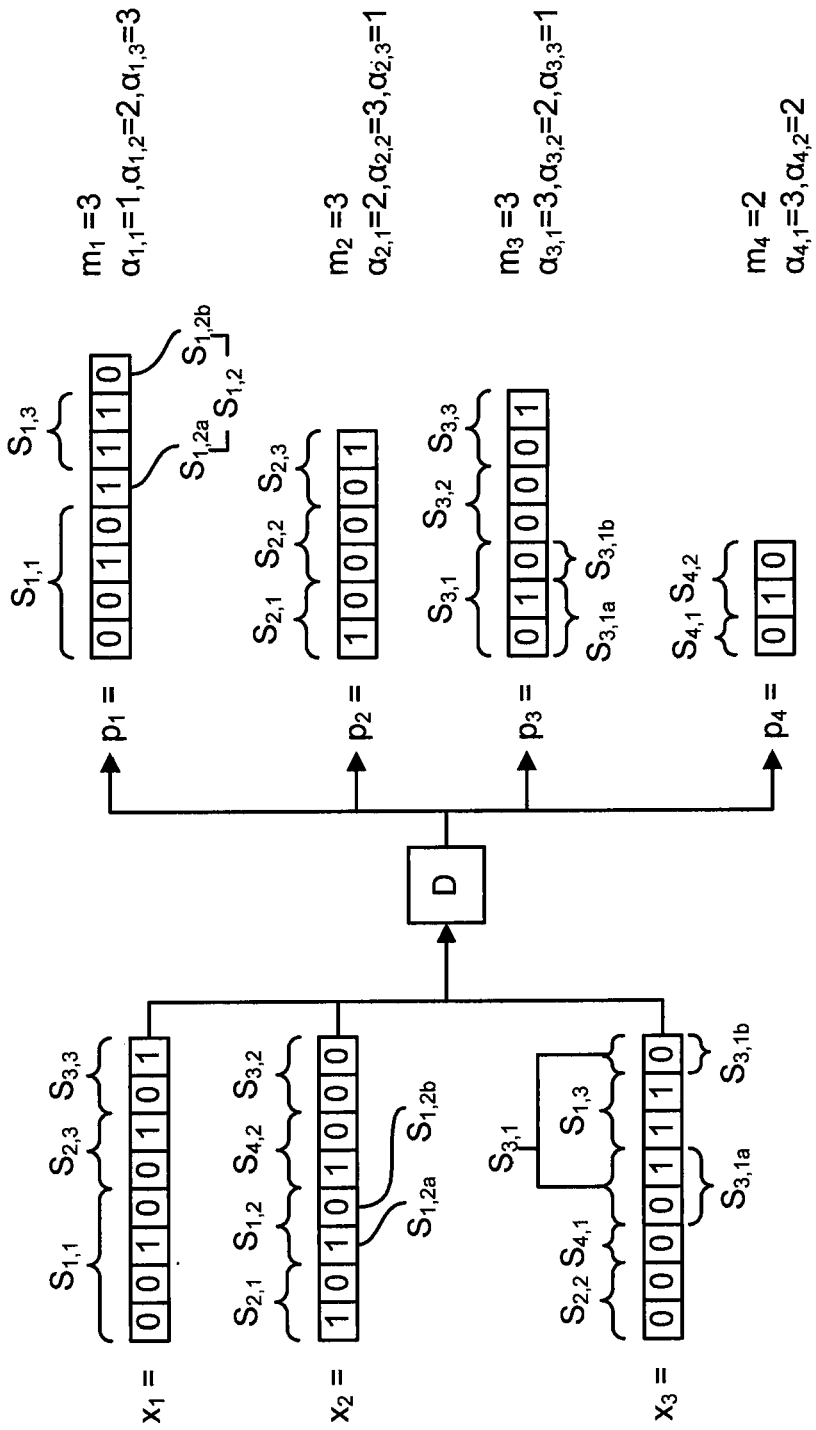
FIG. 4 schematically illustrates an example relationship between a set of inputs $\{x_1, x_2, \ldots, x_W\}$ and a set of values $\{p_1, \ldots, p_M\}$.

FIG. 4 schematically illustrates an example relationship between the set of inputs $\{x_1, x_2, \ldots, x_W\}$ and the set of values $\{p_1, \ldots, p_M\}$. In this example, W=3 (so that there are three inputs $x_i$), M=4 (so that there are four values $p_j$ that are generated at the step 304), and each of the inputs is an 8-bit number. As can be seen:

- The input $x_1$ has three parts $S_{1,1}$, $S_{2,3}$ and $S_{3,3}$ which contribute, respectively, to values $p_1$, $p_2$ and $p_3$. Thus, $x_1$ is an example of an input that does not contribute to all of the values $p_j$ (as it does not contribute to the value $p_4$).
- The input $x_2$ has four parts $S_{2,1}$, $S_{1,2}$, $S_{4,2}$ and $S_{3,2}$ which contribute, respectively, to values $p_2$, $p_1$, $p_4$ and $p_3$. Thus, $x_2$ is an example of an input that does contribute to all of the values $p_j$. In FIG. 4, the part $S_{1,2}$ is shown as being made up of two sections $S_{1,2a}$ and $S_{1,2b}$—the reason for this is described shortly.
- The input $x_3$ has four parts $S_{2,2}$, $S_{4,1}$, $S_{3,1}$ and $S_{1,3}$ which contribute, respectively, to values $p_2$, $p_4$, $p_3$ and $p_1$. Thus, $x_3$ is another example of an input that does contribute to all of the values $p_j$. Note that the part $S_{3,1}$ is not a contiguous part of $x_3$—thus, in FIG. 4, the part $S_{3,1}$ is illustrated as being formed from two separated sections of $x_3$ (labeled $S_{3,1a}$ and $S_{3,1b}$). It will be appreciated that a part $S_{j,k}$ may be made up of any number of separated sections of an input $x_i$.
- The value $p_1$ is formed from the parts $S_{1,1}$, $S_{1,2}$ and $S_{1,3}$. In FIG. 4, the parts $S_{1,1}$, $S_{1,2}$ and $S_{1,3}$ and not simply concatenated in order to form the value $p_1$—for example, the part $S_{1,2}$ is split into two sections $S_{1,2a}$ and $S_{1,2b}$ which are separated from each other (by the part $S_{1,3}$) when forming the value $p_1$. It will be appreciated that a part $S_{j,k}$ may be separated into any number of separated sections when forming a value $p_j$.

The value $p_2$ is formed from the parts $S_{2,1}$, $S_{2,2}$ and $S_{2,3}$.

The value $p_3$ is formed from the parts $S_{3,1}$, $S_{3,2}$ and $S_{3,3}$ (where the part $S_{3,1}$ is made up of sections $S_{3,1a}$ and $S_{3,1b}$ of the input $x_3$).

The value $p_4$ is formed from the parts $S_{4,1}$ and $S_{4,2}$. Thus, the value $p_4$ is an example of a value $p_j$ that does not receive contribution from all of the inputs $x_i$.

Each part $S_{j,k}$ is some or all of one of the inputs $x_i$. If the part $S_{j,k}$ is all of the input $x_i$, then $S_{j,k}=x_i$. Alternatively, if the part $S_{j,k}$ is only some of the input $x_i$, then this means that, given a representation (e.g. binary, decimal, hexadecimal, etc.) of the input $x_i$, then $S_{j,k}$ comprises some of the symbols in that representation (e.g. some of the bits, or some of the decimal or hexadecimal values/symbols, of the representation). For example, with reference to FIG. 4, the input $x_1$ is an 8-bit value that assumes the value 37 and so has a binary representation of (00100101)—then a part may be one or more of these particular bits (e.g. "0010" taken as the first four bits to form the part $S_{1,1}$, or "01" taken as the last two bits to form the part $S_{2,3}$, or indeed, "111" taken as the $3^{rd}$, $6^{th}$ and $8^{th}$ bits to form a different part, etc.). Thus, a part $S_{j,k}$ of an input $x_i$ may be viewed as comprising one or more components or elements or sections or symbols of a representation of that input $x_i$.

Whilst FIG. 4 illustrates the parts of an input $x_i$ as not overlapping each other, it will be appreciated that two or more of the parts of an input $x_i$ could overlap each other, i.e. a part $S_{j_1,k_1}$ of the input $x_i$ that is used to form the value $p_{j_1}$ may overlap (or even be identical to) a part $S_{j_2,k_2}$ of the input $x_i$ that is used to form the value $p_{j_2}$.

Each value $p_j$ ($j=1, \ldots, M$) is formed from its respective parts $S_{j,k}$ ($k=1, \ldots, m_j$) by combining those parts, for example by concatenation/merging/mixing/etc. As will be described later (with reference to the examples shown in FIGS. 7a and 7b), a value $p_j$ may comprise additional components/data, in addition to the parts $S_{j,k}$ ($k=1, \ldots, m_j$). For example, the value $p_j$ may comprise one or more "spacer bits" (which could be initially set to 0) in front of one or more (potentially all) of the parts $S_{j,k}$ ($k=1, \ldots, m_j$)—such spacer bits enable calculations to be performed on the value $p_j$ with room inherently built in for carry bits (for example, if two values $p_{j_1}$ and $p_{j_2}$ are to be added together).

Some specific examples of the distribution function D (and therefore the functions $D_i$) shall be provided later, and it will be appreciated that embodiments of the invention are not limited to the specific examples discussed below. However, to help the understanding at this stage, an example of the distribution function D is as follows:

Assume each input $x_i$ ($i=1, \ldots, W$) is an M-bit value, so that the binary representation of input $x_i$ is $b_{i,1}b_{i,2} \ldots b_{i,M}$ for bits $b_{i,j}$.

The value $p_j$ ($j=1, \ldots, M$) is obtained by concatenating the $j^{th}$ bits of the inputs $x_i$ ($i=1, \ldots, W$), so that, for example, the binary representation of value $p_j$ is $b_{1,j} b_{2,j} \ldots b_{W,j}$ (although it will be appreciated that other orderings are possible and the orderings may vary between values $p_j$).

Hence, the function $D_j$ is defined by $p_j=D(x_1, \ldots, x_W)=b_{1,j}b_{2,j} \ldots b_{W,j}$.

In this case, $m_j=W$ and $\alpha_{j,k}=k$ for $j=1, \ldots, M$ and $k=1, \ldots, W$.

Thus, in this example of the distribution function D, for each value $p_j$ ($j=1, \ldots, M$), the corresponding plurality of the inputs is the full set of inputs $x_1, \ldots, x_W$, and the part $S_{j,k}$ taken from the $k^{th}$ input $x_{\alpha_{j,k}}$ in the corresponding plurality of the inputs is the $k^{th}$ bit of that input $x_{\alpha_{j,k}}$.

It will be appreciated that, at the step 304, the set of values $\{p_1, \ldots, p_M\}$ is a representation of the set of inputs $\{x_1, \ldots, x_W\}$, the representation being according to the distribution function D. A value $p_j$ may be generated as an amount of data (e.g. in the memory 106) distinct from the set of inputs $\{x_1, \ldots, x_W\}$ (so that the value $p_j$ is stored in addition to the set of inputs $\{x_1, \ldots, x_W\}$ and at a distinct address in memory from the set of inputs $\{x_1, \ldots, x_W\}$). However, it will be appreciated that the module implementing the step 304 may determine (or generate) a value $p_j$ from the existing amounts of data already being stored to represent the set of inputs $\{x_1, \ldots, x_W\}$, for example by specifying that value $p_j$ is made up from amounts of data at specific memory addresses, where those memory address store the respective parts of the relevant inputs $x_i$ (in which case these specific memory addresses implicitly define or represent the distribution function D). Thus, when the value $p_j$ is subsequently used, the module making use of the value $p_j$ could simply refer to the specific memory addresses that store the respective parts of the relevant inputs $x_i$—in this case, the step of explicitly generating the values $p_j$ may be omitted, as that module implicitly uses values $p_j$ by virtue of using the correct memory addresses.

Thus, the step 304 may be viewed as a step (either implicit or explicit) of representing the set of inputs $\{x_1, \ldots, x_W\}$ as the set of values $\{p_1, \ldots, p_M\}$.

Next, at a step 306, a set of results $\{q_1, \ldots, q_N\}$ is generated from the set of values $\{p_1, \ldots, p_N\}$. Here, N is an integer greater than or equal to 1.

In particular, for $j=1, \ldots, N$, there is a corresponding set of $n_j$ distinct indices $\{\beta_{j,1}, \ldots, \beta_{j,n_j}\}$ (where $1 \leq \beta_{j,k} \leq M$ for $1 \leq k \leq n_j$, and $n_j \geq 1$) so that $q_j$ is calculated as a function of the set of $n_j$ values $$p_{\beta_{j,1}}, \ldots, p_{\beta_{j,n_j}}$$

according to a predetermined function $F_j$, i.e.

$$q_j = F_j\left(p_{\beta_{j,1}}, \ldots, p_{\beta_{j,n_j}}\right).$$

Here, the function $F_j$ corresponds to (or defines, at least in part) the function F—thus, the function $F_j$ may be viewed as a sub-function corresponding to the function F.

Examples of how the functions $F_1, \ldots, F_N$ are defined and used shall be given later.

Next, at a step 308, the set of outputs $\{y_1, \ldots, y_V\}$ that corresponds to the set of inputs $\{x_1, \ldots, x_W\}$ is generated from the set of results $\{q_1, \ldots, q_N\}$. In particular, the set of outputs $\{y_1, \ldots, y_V\}$ is generated according to $\{y_1, \ldots, y_V\}=E(\{q_1, \ldots, q_N\})$, where E is an invertible function that maps a set of N results $q_j$ to a set of V outputs. Herein, the function E shall be referred to as the "separation function". In particular, the function E is a predetermined function that has the property that each output $y_i$ either is a part of a corresponding one of the results or is a combination of at least part of each result of a corresponding plurality of the results. Put another way, for each value $y_i$ ($i=1, \ldots, V$), there is a corresponding set of $v_i$ distinct indices $\{\gamma_{i,1}, \ldots, \gamma_{i,v_i}\}$ (where $1 \leq \gamma_{i,k} \leq V$ for $1 \leq k \leq v_i$ and $v_i \geq 1$) such that $y_i$ comprises at least part of each of $$q_{\gamma_{i,1}}, \ldots, q_{\gamma_{i,v_i}}.$$

Thus, $$y_i = E_i(q_{Y_i,1}, \ldots, q_{Y_i,v_i})$$

for a function $E_i$ that corresponds to (or defines, at least in part) the separation function E. The production of the set of outputs $\{y_1, \ldots, y_V\}$ from the set of results $\{q_1, \ldots, q_N\}$ via the separation function E (defined by its corresponding functions $E_1, \ldots, E_V$) operates in an analogous way to the production of the set of values $\{p_1, \ldots, p_M\}$ from the set of inputs $\{x_1, \ldots, x_W\}$ via the distribution function D (defined by its corresponding functions $D_1, \ldots, D_M$), so that the description above for the step 304 applies analogously to the step 308.

In some embodiments, when N=M and W=V, the separation function E is the inverse of the distribution function D.

In essence, then, instead of processing a single input to generate a corresponding output y (where this processing is independent of any of the other inputs), a plurality of inputs $x_1, \ldots, x_W$ are processed together to generate a corresponding plurality of outputs $y_1, \ldots, y_V$ by: (a) generating values $p_1, \ldots, p_M$, where each $p_i$ is dependent on multiple ones of the inputs; (b) processing the values $p_1, \ldots, p_M$ using functions $F_1, \ldots, F_N$ (that are based on the function F) to generate results $q_1, \ldots, q_N$; and (c) separating out the outputs $y_1, \ldots, y_V$ from the generated results $q_1, \ldots, q_N$.

2.1—Example 1: General Lookup Table

An initial example will aid understanding the method 300 as described above. Consider a predetermined a lookup table that is implemented by the function F. An example of how the method 300 can be applied to such a function F is described below with reference to FIGS. 5a-5c.

Figure 5A:
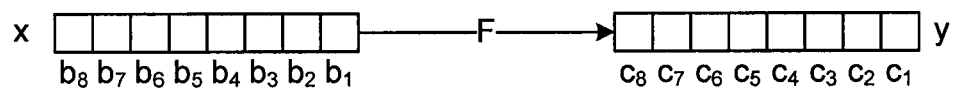
FIGS. 5a-5c schematically illustrate how the method of FIG. 3 can be applied when the function F is a lookup table.

Assume that the input to the lookup table F is an input x that is an M-bit value, where the $k^{th}$ bit of x is $b_k$ so that the binary representation of x is $b_M b_{M-1} \ldots b_2 b_1$, (so that $b_k$ is 0 or 1 for k=1, ..., M). In the example described below, M=8, so that the binary representation of x is $b_8 b_7 b_6 b_5 b_4 b_3 b_2 b_1$. Assume also that the output from the lookup table F (i.e. the value looked-up in response to receiving the input x) is an output y that is an N-bit value, where the $k^{th}$ bit of y is $c_k$ so that the binary representation of y is $c_N c_{N-1} \ldots c_2 c_1$, (so that $c_k$ is 0 or 1 for k=1, ..., N). In the example described below, N=8, so that the binary representation of y is $c_8 c_7 c_6 c_5 c_4 c_3 c_2 c_1$. This is schematically illustrated in FIG. 5a. It will be appreciated, of course, that the input x may comprise a different number of bits and that the output y may comprise a different number of bits (which may be different from the number of bits for the input x), so that having x and y both as 8-bit values is purely for illustrative purposes.

Figure 5B:
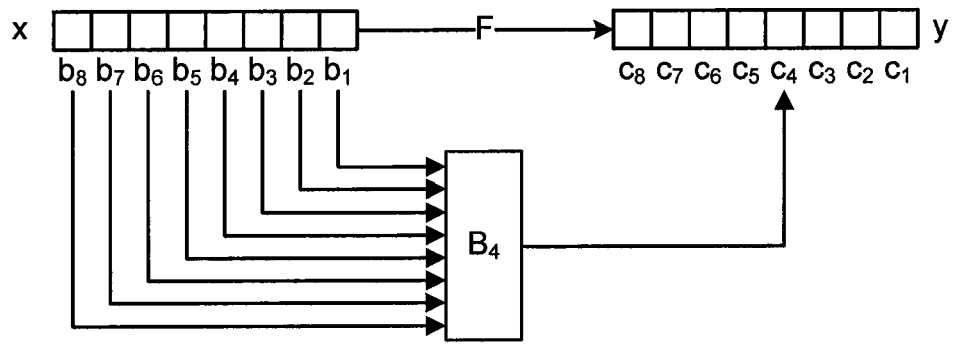

It will be appreciated that each of the output bits $c_k$ can be calculated or expressed as a respective logical expression $B_k$ applied to the input bits $b_i$ i.e. $c_k = B_k(b_1, b_2, \ldots, b_M)$. This is schematically illustrated in FIG. 5b in respect of the output bit $c_4$.

The function $B_k$ can be expressed using one or more logical AND's (an AND is represented herein by $\wedge$), zero or more logical OR's (an OR is represented herein by $\vee$) and zero or more logical NOT's (a NOT is represented herein by $\neg$). In particular, suppose that the lookup table results in output bit $c_k$ assuming the value 1 for n input values $X_1, \ldots, X_n$ (i.e. when x assumes the value of any one of $X_1, \ldots, X_n$), and that for all other possible values for input x, $c_k$ assumes the value 0. For each i=1, ..., n, let $R_i$ be a corresponding logical expression defined by $R_i(b_1, b_2, \ldots, b_M) = b'_M \wedge b'_{M-1} \wedge b'_{M-2} \wedge \ldots \wedge b'_3 \wedge b'_2 \wedge b'_1$ (i.e. an AND of expressions $b'_j$ for j=1, ..., M), where, for j=1, ..., M, $b'_j = b_j$ if the $j^{th}$ bit $b_j$ of the input value $X_i$ is a 1 and $b'_j = \neg b_j$ if the $j^{th}$ bit $b_j$ of the input value $X_i$ is a 0. For example, for the 8-bit input value $X_i$=53 in decimal, or (00110101) in binary, then $R_i(b_1, b_2, \ldots, b_M) = \neg b_8 \wedge \neg b_7 \wedge b_6 \wedge b_5 \wedge \neg b_4 \wedge b_3 \wedge \neg b_2 \wedge b_1$. Thus, $R_i(b_1, b_2, \ldots, b_M)$ only evaluates to the value 1 for an input value of 53. Then, $B_k$ can be defined as $R_1 \vee R_2 \vee \ldots \vee R_n$, i.e. by OR-ing the expressions $R_i$ (i=1, ..., n) together (if n=1, then no OR's are necessary). Then $B_k$ only evaluates to the value 1 for an input that assumes the value of one of $X_1, X_2, \ldots, X_n$. For example, suppose n=3 and $c_4$ only assumes the value of 1 if the input x takes the value 31 (=(00011111) in binary), 53 (=(00110101) in binary) or 149 (=(10010101) in binary). Then:

$$R_1(b_1, b_2, \ldots, b_M) = \neg b_8 \wedge \neg b_7 \wedge \neg b_6 \wedge b_5 \wedge b_4 \wedge b_3 \wedge b_2 \wedge b_1$$

$$R_2(b_1, b_2, \ldots, b_M) = \neg b_8 \wedge \neg b_7 \wedge b_6 \wedge b_5 \wedge \neg b_4 \wedge b_3 \wedge \neg b_2 \wedge b_1$$

$$R_3(b_1, b_2, \ldots, b_M) = b_8 \wedge \neg b_7 \wedge \neg b_6 \wedge b_5 \wedge \neg b_4 \wedge b_3 \wedge \neg b_2 \wedge b_1$$

so that $B_4$ can be expressed as $$B_4(b_1, b_2, \ldots, b_M) = (\neg b_8 \wedge \neg b_7 \wedge \neg b_6 \wedge b_5 \wedge b_4 \wedge b_3 \wedge b_2 \wedge b_1) \vee (\neg b_8 \wedge \neg b_7 \wedge b_6 \wedge b_5 \wedge \neg b_4 \wedge b_3 \wedge \neg b_2 \wedge b_1) \vee (b_8 \wedge \neg b_7 \wedge \neg b_6 \wedge b_5 \wedge \neg b_4 \wedge b_3 \wedge \neg b_2 \wedge b_1) \vee$$

There are, of course, more efficient or optimized ways of expressing $B_k$, i.e. with fewer logical operations. For example, one could express $B_4$ above as follows:

$$B_4(b_1, b_2, \ldots, b_M) = b_1 \wedge b_3 \wedge b_5 \wedge \neg b_7 \wedge ((\neg b_8 \wedge \neg b_6 \wedge b_4 \wedge b_2) \vee (\neg b_8 \wedge b_6 \wedge \neg b_4 \wedge \neg b_2) \vee (b_8 \wedge \neg b_6 \wedge \neg b_4 \wedge \neg b_2))$$

and further more optimized expressions are possible. Indeed, in general, it is expected that an optimized expression may contain between 10% and 20% of the above "naïve" logical expression generated by simply OR-ing together the sub-expressions $R_i$.

Thus, the lookup table F may be considered to be implemented by the functions $B_1, \ldots, B_N$, so that given an input $x = b_M b_{M-1} \ldots b_2 b_1$, the corresponding output $y = c_N c_{N-1} \ldots c_2 c_1$ is defined by $c_k = B_k(b_1, b_2, \ldots, b_M)$ for k=1, ..., N.

Figure 5C:
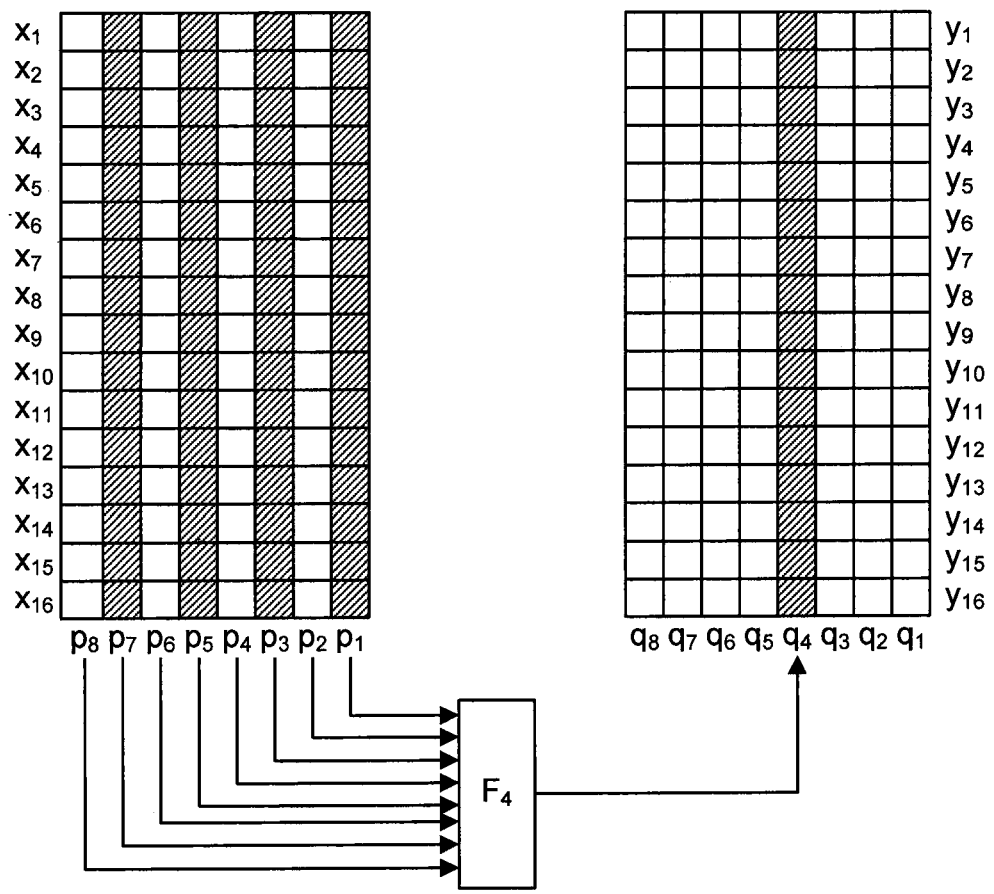

Although implementing the lookup table F by using N separate Boolean expressions $B_1, \ldots, B_N$ may introduce a performance penalty, this can be largely mitigated by performing data-level parallelism. In particular, given a set of inputs $\{x_1, x_2, \ldots, x_W\}$, a set of M values $\{p_1, \ldots, p_M\}$ may be obtained or generated, where each value $p_k$ is a W-bit value, where the $w^{th}$ bit of value $p_k$ is the $k^{th}$ bit of input $x_w$ (for w=1, ..., W and k=1, ..., M). In other words, the set of inputs $\{x_1, x_2, \ldots, x_W\}$ may be expressed or represented as a set of M values $\{p_1, \ldots, p_M\}$. This is illustrated schematically in FIG. 5c, where the input values $x_1, \ldots, x_W$ are shown as the rows of the matrix on the left of FIG. 5c, and the values $p_1, \ldots, p_M$ are shown as the columns of the matrix on the left of FIG. 5c. FIG. 5c similarly shows how the set of outputs $\{y_1, y_2, \ldots, y_V\}$ (that corresponds to the set of inputs $\{x_1, x_2, \ldots, x_W\}$) may be represented or expressed as a set of N results $\{q_1, \ldots, q_N\}$—here V=W given the nature of F being a lookup table. In particular, each intermediate result $q_k$ is a V-bit value, where the $v^{th}$ bit of intermediate result $q_k$ is the $k^{th}$ bit of output $y_v$ (for v=1, ..., V and k=1, ..., N).

Thus, in this example, the distribution function D used at the step 304 of FIG. 3 is a function that maps a set of inputs $\{x_1, x_2, \ldots, x_W\}$ to a set of values $\{p_1, \ldots, p_M\}$ by setting each value $p_k$ to be a W-bit value, where the $w^{th}$ bit of value $p_k$ is the $k^{th}$ bit of input $x_w$ (for w=1, ..., W and k=1, ..., M). Note that, with the distribution function D, each value $p_j$ comprises at least part (namely a single bit) of each input of a corresponding plurality of the inputs (the corresponding plurality of inputs in this example is the whole set of inputs $\{x_1, x_2, \ldots, x_W\}$). Similarly, in this example, the separation function E used at the step 308 of FIG. 3 is a function that maps a set of results $\{q_1, q_2, \ldots, q_N\}$ to a set of outputs $\{y_1, \ldots, y_V\}$ by setting each output $y_v$ to be an N-bit value, where the $k^{th}$ bit of output $y_v$ is the $v^{th}$ bit of result $q_k$ (for v=1, and k=1, ..., N). Note that, with the separation function E, each output $y_i$ comprises at least part (namely a single bit) of each result of a corresponding plurality of the results (the corresponding plurality of results in this example is the whole set of results $\{q_1, q_2, \ldots, q_N\}$).

In FIG. 5b, the function $B_k$ mapped the bits $(b_1, \ldots, b_m)$ of a single input $x_i$ to the $k^{th}$ bit $(c_k)$ of the corresponding output $y_i$. In FIG. 5c, where there are multiple inputs $(x_1, \ldots, x_W)$, the function $B_k$ is replaced by a function $F_k$ that maps the values $p_1, \ldots, p_M$ to the intermediate result $q_k$. The function $F_k$ is the same logical expression as the function $B_k$, except that, in the function $B_k$ the operands $(b_1, \ldots, b_M)$ for the logical operations are single bits, whereas in the function $F_k$ the operands $(p_1, \ldots, p_M)$ for the logical operations are multi-bit values. For the example given above where $$B_4(b_1, b_2, \ldots, b_M) = b_1 \wedge b_3 \wedge b_5 \wedge \neg b_7 \wedge ((\neg b_8 \wedge \neg b_6 \wedge b_4 \wedge b_2) \vee (\neg b_8 \wedge b_6 \wedge \neg b_4 \wedge \neg b_2) \vee (b_8 \wedge \neg b_6 \wedge \neg b_4 \wedge \neg b_2))$$

the corresponding function $F_4$ may be expressed as $$F_4(p_1, p_2, \ldots, p_M) = p_1 \wedge p_3 \wedge p_5 \wedge \neg p_7 \wedge ((\neg p_8 \wedge \neg p_6 \wedge p_4 \wedge p_2) \vee (\neg p_8 \wedge p_6 \wedge \neg p_4 \wedge \neg p_2) \vee (p_8 \wedge \neg p_6 \wedge \neg p_4 \wedge \neg p_2))$$

(where $\wedge$, $\vee$ and $\neg$ in $F_4$ are bit-wise AND, OR and NOT operations on multi-bit operands). For example, the $k^{th}$ bit of the intermediate value $q_4$ is the result of applying the function $B_4$ to the bits of the $k^{th}$ input $x_k$, and this results (in the $k^{th}$ bit position) by applying the function $F_4$ to the values $p_1, \ldots, p_M$.

As processors are often arranged to perform logical operations on multi-bit operands, depending on the word-size of the processor (e.g. by having 32-bit or 64-bit AND, OR and NOT operators), a whole set of outputs $\{y_1, y_2, \ldots, y_W\}$ can be obtained from the set of inputs $\{x_1, x_2, \ldots, x_W\}$ at the same time. This helps mitigate the performance penalty incurred by implementing the lookup table using Boolean expressions.

2.2—Example 2: Particular Lookup Table

A particular example of the "general lookup table" concept set out above in section 2.1 is provided below for a specific example lookup table. This specific lookup table is quite small (for ease of explanation), but, as set out in section 2.1 above, it will be appreciated that the "general lookup table" concept can be applied to other, potentially larger, lookup tables.

Consider the following lookup table that defines the function F:

| Input | Output |
| --- | --- |
| 0 = (000) | 0 = (0000) |
| 1 = (001) | 3 = (0011) |
| 2 = (010) | 0 = (0000) |
| 3 = (011) | 15 = (1111) |
| 4 = (100) | 5 = (0101) |
| 5 = (101) | 11 = (1011) |
| 6 = (110) | 1 = (0001) |
| 7 = (111) | 2 = (0010) |

Here, the input to the function F is a 3-bit number and the output is a 4-bit number. Thus, M=3 and N=4. The above table defines functions $B_1, \ldots, B_4$ as follows:

$$B_4(b_1, b_2, b_3) = (\wedge b_3 \neg b_2 \neg b_1) \vee (b_3 \neg \wedge b_2 \neg b_1)$$

$$B_3(b_1, b_2, b_3) = (\wedge b_3 \neg b_2 \neg b_1) \vee (b_3 \neg \wedge b_2 \neg \wedge b_1)$$

$$B_2(b_1, b_2, b_3) = (\wedge b_3 \neg \wedge b_2 \neg b_1) \vee (\wedge b_3 \neg b_2 \neg b_1) \vee (b_3 \neg \wedge b_2 \neg b_1) \vee (b_3 \neg b_2 \neg b_1)$$

$$B_1(b_1, b_2, b_3) = (\wedge b_3 \neg \wedge b_2 \neg b_1) \vee (\wedge b_3 \neg b_2 \neg b_1) \vee (b_3 \neg \wedge b_2 \wedge b_1) \vee (b_3 \neg \wedge b_2 \neg b_1) \vee (b_3 \neg b_2 \neg \wedge b_1)$$

so that functions $F_1, \ldots, F_4$ (i.e. the sub-functions for function F) are defined by $$F_4(p_1, p_2, p_3) = (\wedge p_3 \neg p_2 \neg p_1) \vee (p_3 \neg \wedge p_2 \neg p_1)$$

$$F_3(p_1, p_2, p_3) = (\wedge p_3 \neg p_2 \neg p_1) \vee (p_3 \neg \wedge p_2 \neg \wedge p_1)$$

$$F_2(p_1, p_2, p_3) = (\wedge p_3 \neg \wedge p_2 \neg p_1) \vee (\wedge p_3 \neg p_2 \neg p_1) \vee (p_3 \neg \wedge p_2 \neg p_1) \vee (p_3 \neg b_2 \neg p_1)$$

$$F_1(p_1, p_2, p_3) = (\wedge p_3 \neg \wedge p_2 \neg p_1) \vee (\wedge p_3 \neg p_2 \neg p_1) \vee (p_3 \neg \wedge p_2 \wedge p_1) \vee (p_3 \neg \wedge p_2 \neg p_1) \vee (p_3 \neg p_2 \neg \wedge p_1)$$

Consider the set of five inputs $\{x_1, x_2, x_3, x_4, x_5\}$, where $x_5=5=(101)$, $x_4=7=(111)$, $x_3=2=(010)$, $x_2=0=(000)$ and $x_1=4=(100)$—i.e. W=5. Then the set of values $\{p_1, p_2, p_3\}$ are formed from the set of three inputs $\{x_1, x_2, x_3\}$ as discussed above, where each value $p_i$ is a W-bit value. Thus, $p_3=(11001)$, $p_2=(01100)$ and $p_1=(11000)$.

Then we note that the set of results $\{q_1, q_2, q_3, q_4\}$ are formed from the set of values $\{p_1, p_2, p_3\}$ according to:

$$q_4 = F_4(p_1, p_2, p_3) = ((00110) \wedge (01100) \wedge (11000)) \vee ((11001) \wedge (10011) \wedge (11000))$$
$$= (00000) \vee (10000)$$
$$= (10000)$$

$$q_3 = F_3(p_1, p_2, p_3) = ((00110) \wedge (01100) \wedge (11000)) \vee ((11001) \wedge (10011) \wedge (00111))$$
$$= (00000) \vee (00001)$$
$$= (00001)$$

-continued $$q_2 = F_2(p_1, p_2, p_3) = ((00110) \wedge (10011) \wedge (11000)) \vee$$
$$((00110) \wedge (01100) \wedge (11000)) \vee$$
$$((11001) \wedge (10011) \wedge (11000)) \vee$$
$$((11001) \wedge (01100) \wedge (11000))$$
$$= (00000) \vee (00000) \vee (100000) \vee (01000)$$
$$= (11000)$$

$$q_1 = F_1(p_1, p_2, p_3) = ((00110) \wedge (10011) \wedge (11000)) \vee$$
$$((00110) \wedge (01100) \wedge (11000)) \vee$$
$$((11001) \wedge (10011) \wedge (00111)) \vee$$
$$((11001) \wedge (10011) \wedge (11000)) \vee$$
$$((11001) \wedge (01100) \wedge (00111))$$
$$= (00000) \vee (00000) \vee (00001) \vee$$
$$(10000) \vee (00000)$$
$$= (10001)$$

The set of five outputs $\{y_1, y_2, y_3, y_4, y_5\}$ are formed from the set of four results $\{q_1, q_2, q_3, q_4\}$ as discussed above, which results in $y_5=(1011)$, $y_4=(0010)$, $y_3=(0000)$, $y_2=(0000)$ and $y_1=(0101)$.

2.3—Example 3: A Different Way of Implementing the Lookup Table of Example 2

The lookup table defined above in section 2.2 need not be implemented using the "general lookup table" concept set out above in section 2.1. There are many ways in which the method 300 of FIG. 3 can be applied to this lookup table (and, indeed, to lookup tables in general). One further example way is set out below, but it will be appreciated that other ways are also possible. Consider again the lookup table that defines the function F:

| Input | Output |
|---|---|
| 0 = (000) | 0 = (0000) |
| 1 = (001) | 3 = (0011) |
| 2 = (010) | 0 = (0000) |
| 3 = (011) | 15 = (1111) |
| 4 = (100) | 5 = (0101) |
| 5 = (101) | 11 = (1011) |
| 6 = (110) | 1 = (0001) |
| 7 = (111) | 2 = (0010) |

Given a set of five inputs $\{x_1, x_2, x_3, x_4, x_5\}$, where each input $x_i$ is a 3-bit value, define the distribution function D by:

$p_1$=(bit 3 of $x_1$)(bit 2 of $x_1$)(bit 3 of $x_2$)(bit 2 of $x_2$)

$p_2$=(bit 1 of $x_1$)(bit 1 of $x_2$)$x_3 x_4 x_5$

Thus, given the set five inputs $\{x_1, x_2, x_3, x_4, x_5\}$ that assume values $x_5=5=(101)$, $x_4=7=(111)$, $x_3=2=(010)$, $x_2=0=(000)$ and $x_1=4=(100)$, the set of values $\{p_1, p_2\}$ is formed from the set of three inputs $\{x_1, x_2, x_3\}$ as discussed above according to the distribution function D, so that $p_1=(1000)$ and $p_2=(00010111101)$.

Define the functions $F_{1A}$, $F_{1B}$, $F_{1C}$, $F_{2A}$, $F_{2B}$, $F_{3A}$, $F_{3B}$, $F_{3C}$, $F_{3D}$ and $F_{3E}$ as follows:

$F_{1A}(p_1,p_2)$=(00) if $(a)(p_1 \wedge (1100)=(0000))$ or $(b)$ $(p_1 \wedge (1100)=(0100))$ and $(p_2 \wedge (10000000000)= (00000000000))$ or $(c)$ $(p_1 \wedge (1100)=(1100))$ $F_{1A}(p_1,p_2)$=(01) if $(p_1 \wedge (1100)=(1000))$ and $(p_2 \wedge (10000000000)=(00000000000))$ $F_{1A}(p_1,p_2)$=(10) if $(p_1 \wedge (1100)=(1000))$ and $(p_2 \wedge (10000000000)=(10000000000))$ $F_{1A}(p_1,p_2)$=(11) if $(p_1 \wedge (1100)=(0100))$ and $(p_2 \wedge (10000000000)=(10000000000))$ $F_{1B}(p_1,p_2)$=(00) if $(a)(p_1 \wedge (0011)=(0000))$ or $(b)$ $(p_1 \wedge (0011)=(0001))$ and $(p_2 \wedge (01000000000)= (00000000000))$ or $(c)$ $(p_1 \wedge (0011)=(0011))$ $F_{1B}(p_1,p_2)$=(01) if $(p_1 \wedge (0011)=(0010))$ and $(p_2 \wedge (01000000000)=(00000000000))$ $F_{1B}(p_1,p_2)$=(10) if $(p_1 \wedge (0011)=(0010))$ and $(p_2 \wedge (01000000000)=(01000000000))$ $F_{1B}(p_1,p_2)$=(11) if $(p_1 \wedge (0011)=(0001))$ and $(p_2 \wedge (01000000000)=(01000000000))$ $F_{1C}(p_2)$=(00) if $(a)(p_2 \wedge (00110000000)= (00000000000))$ or $(b)$ $(p_2 \wedge (00111000000)= (00010000000))$ or $(c)$ $(p_2 \wedge (00110000000)= (00110000000))$ $F_{1C}(p_2)$=(01) if $(p_2 \wedge (00111000000)= (00100000000))$ $F_{1C}(p_2)$=(10) if $(p_2 \wedge (00111000000)= (00101000000))$ $F_{1C}(p_2)$=(11) if $(p_2 \wedge (00111000000)= (00011000000))$ $F_{2A}(p_2)$=(00) if $(a)(p_2 \wedge (00000110000)= (00000000000))$ or $(b)$ $(p_2 \wedge (00000111000)= (00000010000))$ or $(c)$ $(p_2 \wedge (00000110000)= (00000110000))$ $F_{2A}(p_2)$=(01) if $(p_2 \wedge (00000111000)= (00000100000))$ $F_{2A}(p_2)$=(10) if $(p_2 \wedge (00000111000)= (00000101000))$ $F_{2A}(p_2)$=(11) if $(p_2 \wedge (00000111000)= (00000011000))$ $F_{2B}(p_2)$=(00) if $(a)(p_2 \wedge (00000000110)= (00000000000))$ or $(b)$ $(p_2 \wedge (00000000111)= (00000000010))$ or $(c)$ $(p_2 \wedge (00000000110)= (00000000110))$ $F_{2B}(p_2)$=(01) if $(p_2 \wedge (00000000111)= (00000000100))$ $F_{2B}(p_2)$=(10) if $(p_2 \wedge (00000000111)= (00000000101))$ $F_{2B}(p_2)$=(11) if $(p_2 \wedge (00000000111)= (00000000011))$ $F_{3A}(p_1,p_2)$=(00) if $(a)(p_1 \wedge (1100)=(0000))$ and $(p_2 \wedge (10000000000)=(00000000000))$ or $(b)$ $(p_1 \wedge (1100)=(0100))$ and $(p_2 \wedge (10000000000)= (00000000000))$ $F_{3A}(p_1,p_2)=(01)$ if $(a)(p_1 \wedge (1100)=(1000))$ and $(p_2 \wedge (10000000000)=(00000000000))$ or $(b)$ $(p_1 \wedge (1100)=(1100))$ and $(p_2 \wedge (10000000000)=(00000000000))$ $F_{3A}(p_1,p_2)=(10)$ if $(a)(p_1 \wedge (1100)=(1100))$ and $(p_2 \wedge (10000000000)=(10000000000))$ $F_{3A}(p_1,p_2)=(11)$ if $(a)(p_1 \wedge (1100)=(0000))$ and $(p_2 \wedge (10000000000)=(10000000000))$ or $(b)$ $(p_1 \wedge (1100)=(0100))$ and $(p_2 \wedge (10000000000)=(10000000000))$ or $(c)$ $(p_1 \wedge (1100)=(1000))$ and $(p_2 \wedge (10000000000)=(10000000000))$ $F_{3B}(p_1,p_2)=(00)$ if $(a)(p_1 \wedge (0011)=(0000))$ and $(p_2 \wedge (01000000000)=(00000000000))$ or $(b)$ $(p_1 \wedge (0011)=(0001))$ and $(p_2 \wedge (01000000000)=(00000000000))$ $F_{3B}(p_1,p_2)=(01)$ if $(a)(p_1 \wedge (0011)=(0010))$ and $(p_2 \wedge (01000000000)=(00000000000))$ or $(b)$ $(p_1 \wedge (0011)=(0011))$ and $(p_2 \wedge (01000000000)=(00000000000))$ $F_{3B}(p_1,p_2)=(10)$ if $(a)(p_1 \wedge (0011)=(0011))$ and $(p_2 \wedge (01000000000)=(01000000000))$ $F_{3B}(p_1,p_2)=(11)$ if $(a)(p_1 \wedge (0011)=(0000))$ and $(p_2 \wedge (01000000000)=(01000000000))$ or $(b)$ $(p_1 \wedge (0011)=(0001))$ and $(p_2 \wedge (01000000000)=(01000000000))$ or $(c)$ $(p_1 \wedge (0011)=(0010))$ and $(p_2 \wedge (01000000000)=(01000000000))$ $F_{3C}(p_2)=(00)$ if $(a)(p_2 \wedge (00111000000)=(00000000000))$ or $(b)$ $(p_2 \wedge (00111000000)=(00010000000))$ $F_{3C}(p_2)=(01)$ if $(a)(p_2 \wedge (00111000000)=(00100000000))$ or $(b)$ $(p_2 \wedge (00111000000)=(00110000000))$ $F_{3C}(p_2)=(10)$ if $(a)(p_2 \wedge (00111000000)=(00111000000))$ $F_{3C}(p_2)=(11)$ if $(a)(p_2 \wedge (00111000000)=(00001000000))$ or $(b)$ $(p_2 \wedge (00111000000)=(00011000000))$ or $(c)$ $(p_2 \wedge (00111000000)=(00101000000))$ $F_{3D}(p_2)=(00)$ if $(a)(p_2 \wedge (00000111000)=(00000000000))$ or $(b)$ $(p_2 \wedge (00000111000)=(00000010000))$ $F_{3D}(p_2)=(01)$ if $(a)(p_2 \wedge (00000111000)=(00000100000))$ or $(b)$ $(p_2 \wedge (00000111000)=(00000110000))$ $F_{3D}(p_2)=(10)$ if $(a)(p_2 \wedge (00000111000)=(00000111000))$ $F_{3D}(p_2)=(11)$ if $(a)(p_2 \wedge (00000111000)=(00000001000))$ or $(b)$ $(p_2 \wedge (00000111000)=(00000011000))$ or $(c)$ $(p_2 \wedge (00000111000)=(00000101000))$ $F_{3E}(p_2)=(00)$ if $(a)(p_2 \wedge (00000000111)=(00000000000))$ or $(b)$ $(p_2 \wedge (00000000111)=(00000000010))$ $F_{3E}(p_2)=(01)$ if $(a)(p_2 \wedge (00000000111)=(00000000100))$ or $(b)$ $(p_2 \wedge (00000000111)=(00000000110))$ $F_{3E}(p_2)=(10)$ if $(a)(p_2 \wedge (00000000111)=(00000000111))$ $F_{3E}(p_2)=(11)$ if $(a)(p_2 \wedge (00000000111)=(00000000001))$ or $(b)$ $(p_2 \wedge (00000000111)=(00000000011))$ or $(c)$ $(p_2 \wedge (00000000111)=(00000000101))$ Then define the sub-functions $F_1$, $F_2$ and $F_3$ by:

$F_1(p_1, p_2)=F_{1A}(p_1, p_2)F_{1B}(p_1, p_2)F_{1C}(p_2)$, i.e. the concatenation of the outputs of $F_{1A}(p_1, p_2)$ and $F_{1B}(p_1, p_2)$ and $F_{1C}(p_2)$;

$F_2(p_2)=F_{2A}(p_2)F_{2B}(p_2)$ i.e. the concatenation of the outputs of $F_{2A}(p_2)$ and $F_{2B}(p_2)$; and $F_3(p_1, p_2)=F_{3A}(p_1, p_2)F_{3B}(p_1, p_2)F_{3C}(p_2)F_{3D}(p_2)F_{3E}(p_2)$, i.e. the concatenation of the outputs of $F_{3A}(p_1, p_2)$ and $F_{3B}(p_1, p_2)$ and $F_{3C}(p_2)$ and $F_{3D}(p_2)$ and $F_{3E}(p_2)$.

Figure 6:
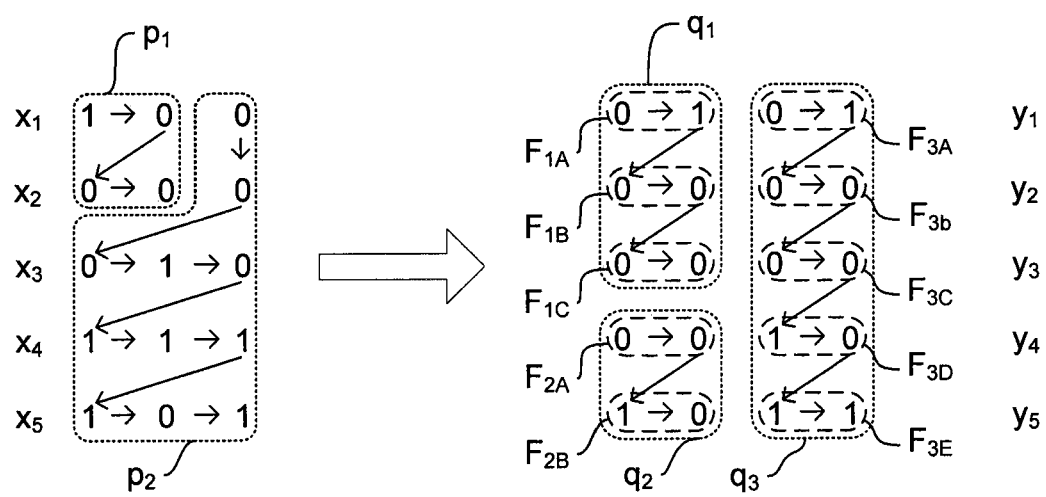
FIG. 6 schematically illustrates the relationship between various sub-functions when implementing an example function using the method of FIG. 3.

Then if $q_1=F_1(p_1, p_2)$ and $q_2=F_2(p_2)$ and $q_3=F_3(p_1, p_2)$, then for $p_1=(1000)$, $p_2=(00010111101)$ as derived above, $q_1=(010000)$, $q_2=(0010)$ $q_3=(0100001011)$. The roles of the functions $F_{1A}$, $F_{1B}$, $F_{1C}$, $F_{2A}$, $F_{2B}$, $F_{3A}$, $F_{3B}$, $F_{3C}$, $F_{3D}$ and $F_{3E}$ relative to the results $q_1$, $q_2$ and $q_3$ is illustrated schematically in FIG. 6.

Define the separation function E as follows:

$y_1$=(bit 6 of $q_1$)(bit 5 of $q_1$)(bit 10 of $q_3$)(bit 9 of $q_3$)

$y_2$=(bit 4 of $q_1$)(bit 3 of $q_1$)(bit 8 of $q_3$)(bit 7 of $q_3$)

$y_3$=(bit 2 of $q_1$)(bit 1 of $q_1$)(bit 6 of $q_3$)(bit 5 of $q_3$)

$y_4$=(bit 4 of $q_2$)(bit 3 of $q_2$)(bit 4 of $q_3$)(bit 3 of $q_3$)

$y_5$=(bit 2 of $q_2$)(bit 1 of $q_2$)(bit 2 of $q_3$)(bit 1 of $q_3$)

Then based on $q_1=(010000)$, $q_2=(0010)$ $q_3=(0100001011)$ as derived above, $y_1=(0101)$, $y_2=(0000)$, $y_3=(0000)$, $y_4=(0010)$ and $y_5=(1011)$.

2.4—Example 4: Any Deterministic Function

Any computer-implemented function can be implemented as a lookup table (albeit a potentially large lookup table). Even if the output of the function is dependent on time, then the time value can be considered to be an input to the lookup table too. Thus, using the principles of section 2.1 above, any computer-implemented function F can be implemented using the method 300 of FIG. 3.

2.5—Example 5: Finite Impulse Response Filters

A further example of the method 300 will be described below, where this example does not rely on the "lookup table principles" described in section 2.1 above. Thus, this example serves to show that, whilst any computer-implemented function can be implemented as a lookup table so that the "lookup table principles" described in section 2.1 above can be used to create a corresponding implementation in the form of the method 300, other (potentially more efficient) implementations of the function F in the form of the method 300 can be achieved via other routes.

Consider a finite impulse response (FIR) filter that is implemented by the function F. In particular, given a sequence (or set) of inputs $x_1, x_2, \ldots$, the FIR filter generates a corresponding sequence (or set) of outputs $y_L, y_{L+1}, \ldots$ according to:

$$y_n = \sum_{i=0}^{L-1} \delta_i x_{n-i}$$

(where L is the length of the filter and $\delta_0, \delta_1, \ldots, \delta_{L-1}$ are the filter weights/taps). A specific example is used below, where L=3 and $\delta_0=\delta_1=\delta_2=\frac{1}{3}$, so that $$y_n = \frac{x_n + x_{n-1} + x_{n-2}}{3},$$

although it will be appreciated that other example FIR filters could be implemented analogously.

Given a set of inputs $\{x_1, x_2, x_3, x_4, x_5\}$ (so W=5), a set of values $\{p_1, p_2, p_3\}$ is formed (so M=3). In particular, value $p_j$ is formed by concatenating: (a) one or more first spacer 0-bits; (b) input $x_j$; (c) one or more second spacer 0-bits; (d) input $x_{j+1}$; (e) one or more third spacer 0-bits; and (f) input $x_{j+2}$. This is illustrated schematically in FIG. 7a. As can be seen, each of the values $p_j$ comprises at least part of each of a corresponding plurality of inputs from the set of inputs $\{x_1, x_2, x_3, x_4, x_5\}$—in particular, for value $p_j$, the corresponding plurality of inputs from the set of inputs are the inputs $x_j, x_{j+1}, x_{j+2}$, and the part of each of these inputs that contributes to the value $p_j$ is the whole of that input. The spacer 0-bits are to enable carry bits to be included when performing additions of the values $p_1$, $p_2$ and $p_3$ for the calculations set out below.

From the set of values $\{p_1, p_2, p_3\}$, a set of results $\{q_1\}$ is formed (so N=1). In particular, $q_1=F_1(p_1, p_2, p_3)=(p_1+p_2+p_3)/3$.

From the set of results $\{q_1\}$, a set of outputs $\{y_3, y_4, y_5\}$ is formed (so V=3) In particular, the result $q_1$ comprises outputs $y_3, y_4, y_5$, where $y_3$ occupies the space/part in $q_1$ that corresponds to the space/part in $p_1$ that was occupied by $x_1$, $y_4$ occupies the space/part in $q_1$ that corresponds to the space/part in $p_1$ that was occupied by $x_2$, and $y_5$ occupies the space/part in $q_1$ that corresponds to the space/part in $p_1$ that was occupied by $x_3$. This is illustrated schematically in FIG. 7a.

As a slight modification of this example, given a set of inputs $\{x_1, x_2, \ldots, x_8\}$ (so W=8), a set of values $\{p_1, p_2, p_3, p_4\}$ is formed (so M=4). In particular, value $p_j$ is formed by concatenating: (a) one or more first spacer 0-bits; (b) input $x_j$; (c) one or more second spacer 0-bits; (d) input $x_{j+2}$; (e) one or more third spacer 0-bits; and (f) input $x_{j+4}$. This is illustrated schematically in FIG. 7b. As can be seen, each of the values $p_j$ comprises at least part of each of a corresponding plurality of inputs from the set of inputs $\{x_1, x_2, \ldots, x_8\}$—in particular, for value $p_j$, the corresponding plurality of inputs from the set of inputs are the inputs $x_j, x_{j+2}, x_{j+4}$, and the part of each of these inputs that contributes to the value $p_j$ is the whole of that input. The spacer 0-bits are to enable carry bits to be included when performing additions of the values $p_1$, $p_2$, $p_3$ and $p_4$ for the calculations set out below.

From the set of values $\{p_1, p_2, p_3, p_4\}$, a set of results $\{q_1, q_2\}$ is formed (so N=2). In particular, $q_1=F_1(p_1, p_2, p_3)=(p_1+p_2+p_3)/3$ and $q_2=F_2(p_2, p_3, p_4)=(p_2+p_3+p_4)/3$.

From the set of results $\{q_1, q_2\}$, a set of outputs $\{y_3, y_4, \ldots, y_8\}$ is formed (so V=6). In particular, the result $q_1$ comprises outputs $y_3, y_5, y_7$, where $y_3$ occupies the space/part in $q_1$ that corresponds to the space/part in $p_1$ that was occupied by $x_1$, $y_5$ occupies the space/part in $q_1$ that corresponds to the space/part in $p_1$ that was occupied by $x_3$, and $y_7$ occupies the space/part in $q_1$ that corresponds to the space/part in $p_1$ that was occupied by $x_5$; the result $q_2$ comprises outputs $y_4, y_6, y_8$, where $y_4$ occupies the space/part in $q_2$ that corresponds to the space/part in $p_1$ that was occupied by $x_1$, $y_6$ occupies the space/part in $q_2$ that corresponds to the space/part in $p_1$ that was occupied by $x_3$, and $y_8$ occupies the space/part in $q_2$ that corresponds to the space/part in $p_1$ that was occupied by $x_5$ This is illustrated schematically in FIG. 7b.

2.6—Example 6: A Set of Lookup Tables

Example 1, as set out in section 2.1 above, illustrated a function F that implements a single look-up table. In other words, for each input $x_i$, i=1, ..., W, an output $y_i$ is generated by setting $y_i$ to be the result of looking-up $x_i$ in a lookup table. In Example 1, the same lookup table was used regardless of the value of the index i. Suppose, instead, that for each input $x_i$ i=1, ..., W, an output $y_i$ is generated by setting $y_i$ to be the result of looking-up $x_i$ in a corresponding lookup table $LT_i$, where the lookup tables $LT_i$ may vary based on the index i, i.e. there may be indices i and j for which $LT_i \neq LT_j$. Thus $y_i=F(x_i)=LT_i(x_i)$.

Again, one can assume that the input to a lookup table $LT_i$ is an input $x_i$ that is an M-bit value, where the $k^{th}$ bit of $x_i$ is $b_{i,k}$ so that the binary representation of $x_i$ is $b_{i,M} b_{i,M-1} \ldots b_{i,2} b_{i,1}$, (so that $b_{i,k}$ is 0 or 1 for k=1, ..., M). In the example described below, M=8, so that the binary representation of $x_i$ is $b_{i,8} b_{i,7} b_{i,6} b_{i,5} b_{i,4} b_{i,3} b_{i,2} b_{i,1}$. Assume also that the output from the lookup table $LT_i$ (i.e. the value looked-up in response to receiving the input $x_i$) is an output $y_i$ that is an N-bit value, where the $k^{th}$ bit of $y_i$ is $c_{i,k}$ so that the binary representation of $y_i$ is $c_{i,N} c_{i,N-1} \ldots c_{i,2} c_{i,1}$, (so that $c_{i,k}$ is 0 or 1 for k=1, ..., N). In the example described below, N=8, so that the binary representation of $y_i$ is $c_{i,8} c_{i,7} c_{i,6} c_{i,5} c_{i,4} c_{i,3} c_{i,2} c_{i,1}$. As with Example 1, this is schematically illustrated in FIG. 5a (except that the subscript i is not shown in FIG. 5a). It will be appreciated, of course, that the input $x_i$ may comprise a different number of bits and that the output $y_i$ may comprise a different number of bits (which may be different from the number of bits for the input $x_i$), so that having $x_i$ and $y_i$ both as 8-bit values is purely for illustrative purposes.

It will be appreciated that each of the output bits $c_{i,k}$ can be calculated or expressed as a respective logical expression $B_{i,k}$ applied to the bits of the input $x_i$ i.e. $c_{i,k}=B_{i,k}(b_{i,1}, b_{i,2}, \ldots, b_{i,M})$. Again, as with Example 1, this is schematically illustrated in FIG. 5b (except that the subscript i is not shown in FIG. 5b). The logical expression $B_{i,k}$ can be determined in the same manner as set out in the description for determining the function $B_k$ for Example 1, with reference to lookup table $LT_i$.

Thus, the lookup table $LT_i$ may be considered to be implemented by the functions $B_{i,1}, \ldots, B_{i,N}$, so that given an input $x_i=b_{i,m} b_{i,M-1} \ldots b_{i,2} b_{i,1}$, the corresponding output $y_i=c_{i,N} c_{i,N-1} \ldots c_{i,2} c_{i,1}$ is defined by $c_{i,k}=B_{i,k}(b_{i,1}, b_{i,2}, \ldots, b_{i,M})$ for k=1, ..., N and i=1, ..., W.

As with Example 1, given a set of inputs $\{x_1, x_2, \ldots, x_W\}$, a set of M values $\{p_1, \ldots, p_M\}$ may be obtained or generated, where each value $p_k$ is a W-bit value, where the $w^{th}$ bit of value $p_k$ is the $k^{th}$ bit of input $x_w$ (for w=1, ..., W and k=1, . . . , M). In other words, the set of inputs $\{x_1, x_2, \ldots, x_W\}$ may be expressed or represented as a set of M values $\{p_1, \ldots, p_M\}$. This is illustrated schematically in FIG. 5c, where the input values $x_1, \ldots, x_W$ are shown as the rows of the matrix on the left of FIG. 5c, and the values $p_1, \ldots, p_M$ are shown as the columns of the matrix on the left of FIG. 5c. FIG. 5c similarly shows how the set of outputs $\{y_1, y_2, \ldots, y_V\}$ (that corresponds to the set of inputs $\{x_1, x_2, \ldots, x_W\}$) may be represented or expressed as a set of N results $\{q_1, \ldots, q_N\}$—here V=W given the nature of F. In particular, each intermediate result $q_k$ is a V-bit value, where the $v^{th}$ bit of intermediate result $q_k$ is the $k^{th}$ bit of output $y_v$ (for v=1, . . . , V and k=1, . . . , N).

Thus, in this example, the distribution function D used at the step 304 of FIG. 3 is a function that maps a set of inputs $\{x_1, x_2, \ldots, x_W\}$ to a set of values $\{p_1, \ldots, p_M\}$ by setting each value $p_k$ to be a W-bit value, where the $w^{th}$ bit of value $p_k$ is the $k^{th}$ bit of input $x_w$ (for w=1, . . . , W and k=1, . . . , M). Note that, with the distribution function D, each value $p_j$ comprises at least part (namely a single bit) of each input of a corresponding plurality of the inputs (the corresponding plurality of inputs in this example is the whole set of inputs $\{x_1, x_2, \ldots, x_W\}$). Similarly, in this example, the separation function E used at the step 308 of FIG. 3 is a function that maps a set of results $\{q_1, q_2, \ldots, q_N\}$ to a set of outputs $\{y_1, \ldots, y_V\}$ by setting each output $y_v$ to be an N-bit value, where the $k^{th}$ bit of output $y_v$ is the $v^{th}$ bit of result $q_k$ (for v=1, . . . , V and k=1, . . . , N). Note that, with the separation function E, each output $y_i$ comprises at least part (namely a single bit) of each result of a corresponding plurality of the results (the corresponding plurality of results in this example is the whole set of results $\{q_1, q_2, \ldots, q_N\}$).

Functions $F_k$ (k=1, . . . , N) that calculate, respectively the results $q_k$ (k=1, . . . , N) may be defined as follows. For k=1, . . . , N, and for v=1, . . . , V, the $v^{th}$ bit of result $q_k = F_k(p_1, \ldots, p_M)$ is defined as $B_{v,k}(p_{1,v}, p_{2,v}, \ldots, p_{M,v})$, where $p_{i,j}$ is the $j^{th}$ bit of value $p_i$ for i=1, . . . , M and j=1, . . . , W.

2.7—Example 7: A Specific Example

Consider the situation in which W=4, M=2 and the function F is defined as follows: $y_i = F(x_i) = x_i + i \mod(4)$. Then the function F can be considered as implementing 4 lookup tables $LT_i$, i=1, . . . , 4, namely:

$F(x_1) = x_1 + 1 \mod(4) = LT_1(x_1)$, so that $LT_1$ is defined as the table

| Input ($x_1$) | Output ($y_1$) |
|---|---|
| 0 = (00) | 1 = (01) |
| 1 = (01) | 2 = (10) |
| 2 = (10) | 3 = (11) |
| 3 = (11) | 0 = (00) |

$F(x_2) = x_2 + 2 \mod(4) = LT_2(x_2)$, so that $LT_2$ is defined as the table

| Input ($x_2$) | Output ($y_2$) |
|---|---|
| 0 = (00) | 2 = (10) |
| 1 = (01) | 3 = (11) |
| 2 = (10) | 0 = (00) |
| 3 = (11) | 1 = (01) |

$F(x_3) = x_3 + 3 \mod(4) = LT_3(x_3)$, so that $LT_3$ is defined as the table

| Input ($x_3$) | Output ($y_3$) |
|---|---|
| 0 = (00) | 3 = (11) |
| 1 = (01) | 0 = (00) |
| 2 = (10) | 1 = (01) |
| 3 = (11) | 2 = (10) |

$F(x_4) = x_4 + 4 \mod(4) = LT_4(x_4)$, so that $LT_4$ is defined as the table

| Input ($x_4$) | Output ($y_4$) |
|---|---|
| 0 = (00) | 0 = (00) |
| 1 = (01) | 1 = (01) |
| 2 = (10) | 2 = (10) |
| 3 = (11) | 3 = (11) |

One can then use the procedure set out in Example 6 to define values $\{p_1, p_2\}$ and functions $F_1$ and $F_2$ that will determine results $\{q_1, q_2\}$.

2.8—Example 8: Another Specific Example

Consider the situation in which W=V=2, M=N=3 and the function F operates on inputs $x_1$ and $x_2$ (whose binary representations are $(x_{1,3}x_{1,2}x_{1,1})$ and $(x_{2,3}x_{2,2}x_{2,1})$ respectively) to yield outputs $y_1$ and $y_2$ (whose binary representations are $(y_{1,3}y_{1,2}y_{1,1})$ and $(y_{2,3}y_{2,2}y_{2,1})$ respectively) according to the affine transformation $Y = F(x_1, x_2) = MX + B$, where $$X = \begin{pmatrix} x_{1,1} \\ x_{1,2} \\ x_{1,3} \\ x_{2,1} \\ x_{2,2} \\ x_{2,3} \end{pmatrix}, Y = \begin{pmatrix} y_{1,1} \\ y_{1,2} \\ y_{1,3} \\ y_{2,1} \\ y_{2,2} \\ y_{2,3} \end{pmatrix},$$

M is a 6×6 binary matrix, and B is a 6×1 binary matrix, where addition is modulo 2. As an example, let $$M = \begin{pmatrix} 1 & 0 & 0 & 1 & 1 & 0 \\ 0 & 0 & 0 & 0 & 1 & 1 \\ 1 & 0 & 1 & 0 & 0 & 0 \\ 0 & 1 & 1 & 0 & 0 & 0 \\ 0 & 0 & 0 & 0 & 1 & 0 \\ 1 & 0 & 0 & 0 & 0 & 1 \end{pmatrix} \text{ and } B = \begin{pmatrix} 0 \\ 0 \\ 1 \\ 0 \\ 1 \\ 1 \end{pmatrix}$$

so that $y_{1,1} = x_{1,1} \oplus x_{2,1} \oplus x_{2,2}$ $y_{1,2} = x_{2,2} \oplus x_{2,3}$ $y_{1,3} = x_{1,1} \oplus x_{1,3} \oplus 1$ $y_{2,1} = x_{1,2} \oplus x_{1,3}$ $y_{2,2} = x_{2,2} \oplus 1$ $y_{2,3} = x_{1,1} \oplus x_{2,3} \oplus 1$ This is another example of where the predetermined function F applies different processing to obtain $y_1$ from one or more of the inputs (here, $x_1$ and $x_2$) than it applies to obtain $y_2$ from those inputs.

Define values $p_1$, $p_2$ and $p_3$ as values whose binary representations are: $p_3=(p_{3,2}p_{3,1})=(x_{1,3}x_{2,2})$, $p_2=(p_{2,3}p_{2,2}p_{2,1})=(x_{1,2}x_{2,1}x_{1,3})$, $p_1=(p_{1,2}p_{1,1})=(x_{1,1}x_{2,3})$. This defines the distribution function D.

Define results $q_1, \ldots, q_6$ as $q_1=y_{1,1}$, $q_2=y_{1,2}$, $q_3=y_{1,3}$, $q_4=y_{2,1}$, $q_5=y_{2,2}$, $q_6=y_{2,3}$. This defines the separation function E.

Then functions $F_1, \ldots, F_6$ can be defined as follows:

$q_1 = F_1(p_1, p_2, p_3) = p_{1,2} \oplus p_{2,2} \oplus p_{3,1}$ $q_2 = F_2(p_1, p_3) = p_{3,1} \oplus p_{1,1}$ $q_3 = F_3(p_1, p_3) = p_{1,2} \oplus p_{3,2} \oplus 1$ $q_4 = F_4(p_2) = p_{2,3} \oplus p_{2,1}$ $q_5 = F_5(p_2, p_3) = p_{3,1} \oplus 1$ or $p_{3,2} \oplus p_{2,1} \oplus p_{3,1} \oplus 1$ $q_6 = F_6(p_1) = p_{1,2} \oplus p_{1,1} \oplus 1$

3—Obfuscation via Bijective Functions

Embodiments of the invention aim to be able to execute code, that implements the function F, securely in a so-called white-box environment. A "white box environment" is an execution environment in which a person can execute an amount of computer code (or software)—where the code implements the function F—and the person may inspect and modify the code (or be assumed to know the underlying algorithm that is being implemented) and/or, during execution of the code, the person may inspect and modify the values of data being used (i.e. the contents of the memory being used), the data flow and the process flow (or order of execution of instructions in the code). Embodiments of the invention therefore aim to be able to provide or generate code (that implements the function F) such that, even if the code is executed in a white-box environment, the person executing the code cannot determine the values of inputs to the function F and/or outputs of the function F and/or secret information used by the function F.

In the following, one or more bijective functions (or transformations or transforms) will be used. A bijective function is a function that is injective (i.e. is a 1-to-1 mapping) and that is surjective (i.e. maps onto the whole of a particular range of values). If the domain of possible input values for the function T is domain Dom, and if the function T is an injective function (so that $T(a)=T(b)$ if and only if $a=b$), then T is a bijective function from Dom onto the range $T(\text{Dom})=\{T(a): a \in \text{Dom}\}$.

An initial simple example will help understand how the use of bijective functions T can help achieve the above aim. In this example, the bijective functions T are linear transformations in a Galois field $GF(\Psi^n)$ for some prime number $\Psi$ and positive integer n, i.e. $T: GF(\Psi^n) \rightarrow GF(\Psi^n)$. For example, if the processor executing the code uses Z-bit registers for its data (e.g. Z=32), then a Z-bit number may be viewed as an element of the Galois field $GF(2^Z)$, so that $\Psi=2$ and $n=Z$.

Consider a predetermined function G that operates on elements $s_1$ and $s_2$ in the Galois field $GF(\Psi^n)$ according to $r=G(s_1, s_2)=s_1+s_2$, where + is addition in the Galois field $GF(\Psi^n)$. In this Galois field $GF(\Psi^n)$, the addition $s_1+s_2$ is the same as an XOR operation, so that $r=G(s_1, s_2)=s_1 \oplus s_2$. Let $s_1^*$, $s_2^*$ and $r^*$ be transformed versions of $s_1$, $s_2$ and r according to respective linear transformations $T_1$, $T_2$ and $T_3$ in the Galois field $GF(\Psi^n)$, so that $s_1^*=T_1(s_1)=a \cdot s_1+b$, $s_2^*=T_2(s_2)=c \cdot s_2+d$ and $r^*=T_3(r)=e \cdot r+f$ for arbitrary non-zero constants a, c, and e in the Galois field $GF(\Psi^n)$, and arbitrary constants b, d and f in the Galois field $GF(\Psi^n)$ (so that constants a, c, and e may be randomly chosen from $GF(\Psi^n)/\{0\}$ and constants b, d, and f may be randomly chosen from $GF(\Psi^n)$). Then $r^*=e \cdot (s_1+s_2)+f=e \cdot (a^{-1}(s_1^*+b)+c^{-1}(s_2^*+d))+f=g \cdot s_1^*+h \cdot s_2^*+i$, where $g=e \cdot a^{-1}$, $h=e \cdot c^{-1}$ and $i=e \cdot (a^{-1}b+c^{-1}d)+f$.

Thus, given the transformed versions $s_1^*=T_1(s_1)$ and $s_2^*=T_2(s_2)$ of the inputs $s_1$ and $s_2$, it is possible to calculate the transformed version $r^*=T_3(r)$ of the result r without having to remove any of the transformations (i.e. without having to derive $s_1$ and/or $s_2$ from the versions $s_1^*$ and $s_2^*$). In particular, having defined the transformations $T_1$, $T_2$ and $T_3$ by their respective parameters (a and b for $T_1$, c and d for $T_2$, e and f for $T_3$), a transformed version $G^*$ of the function G can be implemented according to $G^*(s_1^*, s_2^*)=g \cdot s_1^*+h \cdot s_2^*+i$, where $g=e \cdot a^{-1}$, $h=e \cdot c^{-1}$ and $i=e \cdot (a^{-1}b+c^{-1}d)+f$, so that $r^*=G^*(s_1^*, s_2^*)$ can be calculated without determining/revealing $s_1$ or $s_2$ as an intermediate step in the processing. The result r can then be obtained from the transformed version $r^*=G^*(s_1^*, s_2^*)$ of the result r, as $r=e^{-1}(r^*+f)$)—thus, a linear transformation $T_4$ (which is the inverse of $T_3$) can be used to obtain the result r from the transformed version $r^*$, where $r=T_4(r^*)=e^{-1}r^*+e^{-1}f$. Alternatively, the transformed version $r^*$ of the result r could be an input to a subsequent function. In other words, given the function G that operates on inputs $s_1$ and $s_2$ to produce a result r, if transformations $T_1$, $T_2$ and $T_3$ are specified (e.g. randomly, by choosing the parameters for the transformations randomly, or based on some other parameters/data), then a transformed version $G^*$ of the function G can be generated/implemented, where the function $G^*$ operates on transformed inputs $s_1^*=T_1(s_1)$ and $s_2^*=T_2(s_2)$ to produce a transformed result $r^*=T_3(r)$ according to $r^*=g \cdot s_1^*+h \cdot s_2^*+i$. If a person implements the function $G^*$ in a white-box environment, then that person cannot identify what operation the underlying function G is performing, nor can the person determine the actual result r nor in inputs $s_1$ and $s_2$ (since these values are never revealed when performing the function $G^*$).

Note that it is possible for one or both of $T_1$ and $T_2$ to be the identity transformation (i.e. $T_1$ is the identity transformation if $T_1(s_1)=s_1$ for all values of $s_1$, so that a=1 and b=0 in the above example, and $T_2$ is the identity transformation if $T_2(s_2)=s_2$, so that c=1 and d=0 in the above example). If this is the case, then the person implementing the function $G^*$ can identify the value assumed by the input $s_1$ (if $T_1$ is the identity transformation) and/or the value assumed by the input $s_2$ (if $T_2$ is the identity transformation). However, so long as $T_3$ is not the identity transformation, then that person cannot identify what operation the underlying function G is performing, nor can the person determine the actual result r.

Similarly, it is possible for $T_3$ to be the identity transformation (i.e. $T_3$ is the identity transformation if $T_3(r)=r$ for all values of r, so that e=1 and f=0 in the above example). If this is the case, then the person implementing the function $G^*$ can identify the value assumed by the output r. However, so long as one or both of $T_1$ and $T_2$ are not the identity transformation, then that person cannot identify what operation the underlying function G is performing, nor can the person determine one or both of the initial inputs $s_1$ and $s_2$.

It will be appreciated that other functions G could be implemented as a corresponding "transformed version" $G^*$, where the input(s) to the function G* are transformed versions of the input(s) to the function G according to respective injective (1-to-1) transformations and the output(s) of the function G* are transformed versions of the output(s) of the function G according to respective injective transformations. The transformations need not necessarily be linear transformations as set out above, but could be any other kind of injective transformation. Thus, given a function G that has u inputs $s_1, \ldots, s_u$ and v outputs $r_1, \ldots, r_v$, a transformed version G* of the function G can be implemented, where G* has transformed versions $s_1^*, \ldots, s_u^*$ of the inputs $s_1, \ldots, s_u$ as its input and outputs transformed versions $r_1^*, \ldots, r_v^*$ of the outputs $r_1, \ldots, r_v$, where $s_i^* = T_i(s_i)$ and $r_i^* = T_{i+u}(r_i)$ for injective functions $T_1, \ldots, T_{u+v}$. It is possible that two or more of the functions $T_i$ might be the same as each other. The fact that this can be done for any function G is discussed below.

As set out below, the XOR operation, along with conditional branching on constants, forms a system which is Turing complete. This means that any mathematical function can be implemented using only (a) zero or more XOR operations and (b) zero or more conditional branchings on constants.

A Turing machine is a notional device that manipulates symbols on a strip of tape according to a table of rules. Despite its simplicity, a Turing machine can be adapted to simulate the logic of any computer algorithm. The Turing machine mathematically models a machine that mechanically operates on a tape. On this tape are symbols which the machine can read and write, one at a time, using a tape head. Operation is fully determined by a finite set of elementary instructions such as "in state 42, if the symbol seen is 0, write a 1; if the symbol seen is 1, change into state 17; in state 17, if the symbol seen is 0, write a 1 and change to state 6" etc. More precisely, a Turing machine consists of:

1. A tape which is divided into cells, one next to the other. Each cell contains a symbol from some finite alphabet. The alphabet contains a special blank symbol (here written as 'B') and one or more other symbols. The tape is assumed to be arbitrarily extendable to the left and to the right, i.e. the Turing machine is always supplied with as much tape as it needs for its computation. Cells that have not been written to before are assumed to be filled with the blank symbol.
2. A head that can read and write symbols on the tape and move the tape left and right one (and only one) cell at a time.
3. A state register that stores the current state of the Turing machine, one of finitely many states. There is one special start state with which the state register is initialized.
4. A finite table (occasionally called an action table or transition function) of one or more instructions (each usually expressed as a respective quintuple $s_i a_j \rightarrow s_{i1} a_{j1} d_k$) that specifies that: if the Turing machine is currently in the state $s_i$ and has currently read the symbol $a_j$ from the tape (i.e. the symbol currently under the head is $a_j$), then the Turing machine should carry out the following sequence of operations:
   Write $a_{j1}$ in place of the current symbol $a_j$. (Symbol $a_{j1}$ could be the blank symbol).
   Control the position of the head, as described by $d_k$. $d_k$ can have values: 'L' to indicate moving the head one cell left, 'R' to indicate moving the head one cell right; or 'N' to indicate not moving the head, i.e. staying in the same place.
   Set the current state to be the state specified by $s_{i1}$ (which may be the same as, or different from, $s_i$).

Turing machines are very well-known and shall, therefore, not be described in more detail herein.

If it can be shown that any possible 5-tuple in the action table can be implemented using the XOR operation and conditional branching on constants, then we know that a processing system based on the XOR operation and conditional branching on constants is Turing complete (since any function or computer program can be implemented or modelled as a Turing machine, and all of the 5-tuples in the action table of that Turing machine can be implemented using the XOR operation and conditional branching on constants).

Consider the following mappings between the elements in the Turing machine and those in a system that uses only XORs and conditional branching on constants:

(a) The alphabet size of the Turing machine is set to the size $\Psi''$ of the alphabet $GF(\Psi'')$.
(b) Each state is implemented as a block of code with an identifier (used to jump to). Hence, the next state in the Turing machine can be realized by the Go To statement, conditioned on the current state and the content of the memory (i.e. conditional branching based on constants).
(c) The tape can be implemented as a memory holding the binary representation of the elements in the alphabet. Hence, the movements in the tape can be realized by changing the address pointing to the memory.
(d) A global variable, referred to as "Address", is used to point to the memory location equivalent to the tape section under the head.
(e) We read the memory content using its address. To write into the memory, we XOR the memory content with a constant that yields the desired value.

The following pseudo-code shows a typical state implementation (for the state with identifier "i"); where values $X_1, X_2, \ldots, X_q$ are constants and "Addr" is the pointer to a memory location. The example shown below illustrates the three possibilities of incrementing, decrementing and not-changing the address "Addr" variable.

```
Block i:
{
  Mem = Memory(Addr)      // Read data stored on the tape at the current
                          //    address Addr
  Begin switch(Mem)
    case 1: {Memory(Addr) = XOR(Mem,X₁), Addr++, Go to Block j₁}
                          // If the data read equals 1, then write the
                          //    value 1⊕X₁ to the tape, move the head to the
                          //    right, and go to state j₁
    case 2: {Memory(Addr) = XOR(Mem,X₂), Addr--, Go to Block j₂}
                          // If the data read equals 2, then write the
                          //    value 2⊕X₂ to the tape, move the head to the
                          //    left, and go to state j₂
       .
       .
       .
    case q: {Memory(Addr) = XOR(Mem,X_q), Addr, Go to Block j_q}
                          // If the data read equals q, then write the
                          //    value q⊕X_q to the tape, keep the head at its
                          //    current position, and go to state j_q
  end switch (Mem)
}
```

Thus, any possible 5-tuple in the action table can be implemented using the XOR operation and conditional branching. Hence, a system based on the XOR operation and conditional branching is Turing complete, i.e. any Turing machine can be implemented using only XORs (for point (e) above) and conditional jumps (for point (b) above).

As shown above, it is possible to perform an operation in the transformed domain (via the function G*) that is equivalent to $r=s_1 \oplus s_2$ without ever removing the transformations on $r^*$, $s_1^*$ or $s_2^*$. A conditional jump is implemented using the capabilities of the programming language. This means that it is possible to implement any mathematical operation in the transformed domain without ever removing the transformations on the data elements being processed. In other words, given any function G that has u inputs $s_1, \ldots, s_u$ ($u \geq 1$) and v outputs $r_1, \ldots, r_v$, ($v \geq 1$), a transformed version G* of the function G can be implemented, where G* is a function that has transformed versions $s_1^*, \ldots, s_u^*$ of the inputs $s_1, \ldots, s_u$ as its input(s) and that outputs transformed versions, $r_1^*, \ldots, r_v^*$ of the output(s) $r_1, \ldots, r_v$, where $s_i^*=T_i(s_i)$ and $r_i^*=T_{i+u}(r_i)$ for injective functions $T_1, \ldots, T_{u+v}$. It is possible that two or more of the functions $T_i$ might be the same as each other. As set out above, the injective functions $T_1, \ldots, T_{u+v}$ may be defined (e.g. randomly generated injective functions), and, given the particular injective functions $T_1, \ldots, T_{u+v}$ that are defined, a particular transformed version G* of the function G results (or is defined/obtained/implemented).

The use of bijective functions T to obfuscate the implementation of a predetermined function, and the various methods of such use, are well-known in this field of technology—see, for example: "*White-Box Cryptography and an AES Implementation*", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002; "*A White-Box DES Implementation for DRM Applications*", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002; U.S. 61/055,694; WO2009/140774; U.S. Pat. Nos. 6,779,114; 7,350,085; 7,397,916; 6,594,761; and 6,842,862, the entire disclosures of which are incorporated herein by reference.

4—Obfuscated Performance, and Implementation, of a Predetermined Function

As will be described in more detail below, embodiments of the invention relate to a predetermined function F. Some embodiments relate to obfuscated performance (or execution or running) of the function F. The function F may be performed, for example, by the system 100 (for example by the processor 108 executing a computer program that implements, amongst other things, the function F). Other embodiments relate to configuring a processor to implement the function F in an obfuscated manner (such as arranging the processor 108 to execute a suitable computer program). Embodiments of the invention aim to be able to execute code, that implements the function F, securely in a white-box environment.

The function F is a function as described in section 2 above, namely one for which one or more corresponding functions (referred to herein as "sub-functions") $F_1, \ldots, F_N$ can be defined so that, for a set of inputs $\{x_1, \ldots, x_W\}$ for the function F, a set of outputs $\{y_1, \ldots, y^r\}$ from the function F that corresponds to the set of inputs $\{x_1, \ldots, x_W\}$ may be generated by:

(a) representing the set of inputs $\{x_1, \ldots, x_W\}$ as a corresponding set of values $\{p_1, \ldots, p_M\}$, wherein each value $p_j$ (j=1, ..., M) comprises at least part of each input of a corresponding plurality of the inputs;

(b) generating a set of one or more results $\{q_1, \ldots, q_N\}$ from the set of values $\{p_1, \ldots, p_M\}$, by applying each sub-function $F_j$ (j=1, ..., N) to a corresponding set of one or more values in the set of values $\{p_1, \ldots, p_M\}$ to generate a respective result $q_j$; and (c) forming each output $y_i$ as either a part of a corresponding one of the results or as a combination of at least part of each result of a corresponding plurality of the results.

Thus, the function F is a function that can be implemented according to the method 300 of FIG. 3. As discussed above, all computer-implemented functions F can be implemented, or expressed, in the manner set out above, so that embodiments of the invention are applicable to all predetermined computer-implemented functions F.

Figure 8:
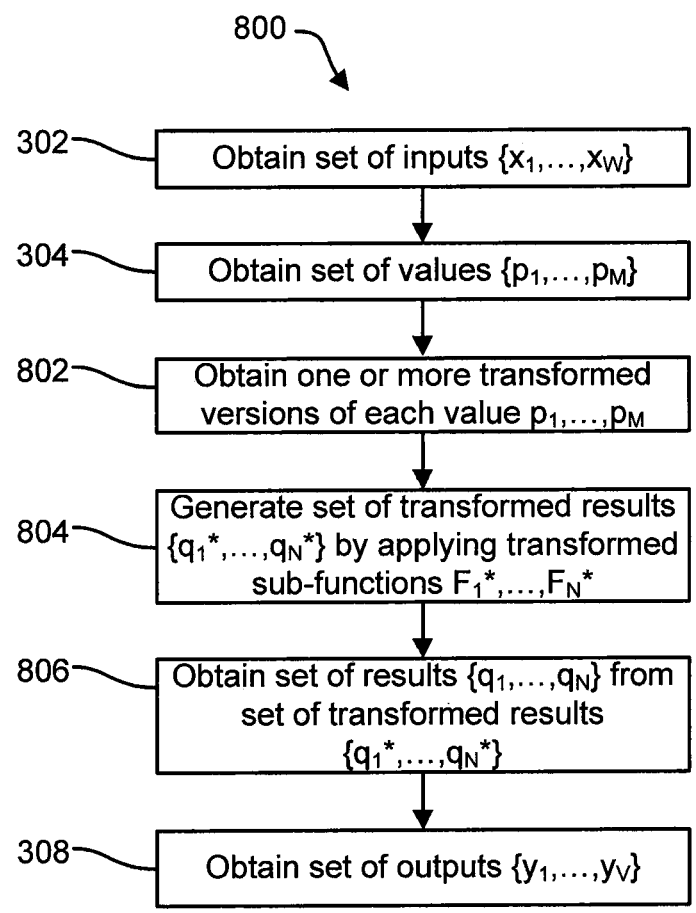
FIG. 8 schematically illustrates a method for performing (or implementing) the function F in an obfuscated form according to embodiments of the invention.

FIG. 8 schematically illustrates a method 800 for performing (or implementing) the function F in an obfuscated form according to embodiments of the invention, i.e. for performing (or implementing) the function F in a secured manner suitable for a white-box environment. The method 800 is the same as the method 300, except that the step 306 of the method 300 is replaced by steps 802, 804 and 806 in the method 800. As the steps 302, 304 and 308 are the same in the method 800 as they are in the method 300, they shall not be described again herein.

To recap, at the step 306 of the method 300, the set of values $\{p_1, \ldots, p_M\}$ was processed, using the sub-functions $F_1, \ldots, F_N$, so as to generate the set of results $\{q_1, \ldots, q_N\}$. In embodiments of the invention, transformed versions of the functions $F_1, \ldots, F_N$ are used instead of the functions $F_1, \ldots, F_N$.

In particular, as discussed above, for each j=1, ..., N, there is a corresponding set of $n_j$ distinct indices $\{\beta_{j,1}, \ldots, \beta_{j,n_j}\}$ (where $1 \leq \beta_{j,k} \leq M$ for $1 \leq k \leq n_j$, and $n_j \geq 1$) so that $q_j$ is calculated as a function of the set of $n_j$ values $$p_{\beta_{j,1}}, \ldots, p_{\beta_{j,n_j}}$$

according to a predetermined function $F_j$, i.e.

$$q_j = F_j\left(p_{\beta_{j,1}}, \ldots, p_{\beta_{j,n_j}}\right).$$

Therefore, at the step 802, for each j=1, ..., N, transformed versions $$p^*_{\beta_{j,1}}, \ldots, p^*_{\beta_{j,n_j}}$$

of the $n_j$ values $$p_{\beta_{j,1}}, \ldots, p_{\beta_{j,n_j}}$$

are obtained, using respective infective transforms $T_{j,1}, \ldots, T_{j,n_j}$, i.e. $p_{\beta_{j,k}}^* = T_{j,k}(p_{\beta_{j,k}})$ for j=1, ..., M and k=1, ..., $n_j$.

It will be appreciated that all of the transforms $T_{j,k}$ may be different from each other for j=1, ..., M and k=1, ..., $n_j$. However, it will be appreciated that some or all of the transforms $T_{j,k}$ may be the same as each other for $j=1, \ldots, M$ and $k=1, \ldots, n_j$. For example, there may be a single transform T such that $T_{j,k}=T$ for $j=1, \ldots, M$ and $k=1, \ldots, n_j$. Similarly, there may be M different transforms $T'_1, \ldots, T'_M$, so that $T_{j,k}=T'_i$ if $\beta_{j,k}=i$, i.e. each value $p_i$ is only transformed by one transform $T'_i$. In some embodiments, at least one of the values $p_i$ is transformed by two or more different transforms to obtain two or more corresponding different transformed versions of the value $p_i$. Other embodiments may make use of different mixes/combinations of transforms.

As discussed above in section 3, the transforms $T_{j,k}$ ($j=1, \ldots, M$ and $k=1, \ldots, n_j$) may be any injective functions (so that $T_{j,k}$ is a 1-1 function over the domain of the possible values that $p_j$ may assume). In some embodiments, some or all of the transforms $T_{j,k}$ ($j=1, \ldots, M$ and $k=1, \ldots, n_j$) are linear transformations (such as those set out in section 3 above), but it will be appreciated that this need not be the case. Each transform $T_{j,k}$ ($j=1, \ldots, M$ and $k=1, \ldots, n_j$) is predetermined, and may be defined, for example, by randomly selecting one or more parameters that define the transform or based on other data/parameters—for example, if transform $T_{j,k}$ is a linear transform so that $p_{\beta_{j,k}}^* = T_{j,k}(p_{\beta_{j,k}}) = a_{j,k} p_{\beta_{j,k}} + b_{j,k}$ for a non-zero constant $a_{j,k}$ and a constant $b_{j,k}$, then $a_{j,k}$ and $b_{j,k}$ may be randomly chosen (prior to performing the method 800).

At the step 804, transformed versions $F_1^*, \ldots, F_N^*$ of the sub-functions $F_1, \ldots, F_N$ are used to generate a set of transformed results $\{q_1^*, \ldots, q_N^*\}$. In particular, $$q_j^* = F_j^*\left(p_{\beta_{j,1}}^*, \ldots, p_{\beta_{j,n_j}}^*\right)$$

for $j=1, \ldots, N$.

At the step 806, the set of results $\{q_1, \ldots, q_N\}$ is obtained from the set of transformed results $\{q_1^*, \ldots, q_N^*\}$. In particular, for $j=1, \ldots, N$, the result $q_j$ is calculated by applying a transform $\tilde{T}_j$ to the transformed result $q_j^*$, so that $q_j = \tilde{T}_j(q_j^*)$. It will be appreciated that all of the transforms $\tilde{T}_j$ may be different from each other, for $j=1, \ldots, N$. However, it will be appreciated that some or all of the transforms $\tilde{T}_j$ may be the same as each other, for $j=1, \ldots, N$.

As discussed above in section 3, the transforms $\tilde{T}_j$ ($j=1, \ldots, N$) may be any injective functions (so that $\tilde{T}_j$ is a 1-1 function over the domain of the possible values that $q_j^*$ may assume). In some embodiments, one or more of the transforms $\tilde{T}_j$ ($j=1, \ldots, N$) are linear transformations (such as those set out in section 3 above), but it will be appreciated that this need not be the case. Each transform $\tilde{T}_j$ ($j=1, \ldots, N$) is predetermined, and may be defined, for example, by randomly selecting one or more parameters that define the transform or based on other data/parameters—for example, if transform $\tilde{T}_j$ is a linear transform so that $q_j = \tilde{T}_j(q_j^*) = a_j q_j^* + b_j$ for a non-zero constant $a_j$ and a constant $b_j$, then $a_j$ and $b_j$ may be randomly chosen (prior to performing the method 800).

The initial sub-function $F_j$ ($j=1, \ldots, N$) has $n_j$ inputs $p_{\beta_{j,1}}, \ldots, p_{\beta_{j,n_j}}$ and an output $q_j$. Thus, given the associated transforms $T_{j,1}, \ldots, T_{j,n_j}$ and $\tilde{T}_j$, the transformed version $F_j^*$ of the function $F_j$ may be defined (as set out in section 3 above), where the function $F_j^*$ has $n_j$ inputs $$p_{\beta_{j,1}}^*, \ldots, p_{\beta_{j,n_j}}^*$$

and an output $q_j^*$, where $p_{\beta_{j,k}}^* = T_{j,k}(p_{\beta_{j,k}})$ for $j=1, \ldots, M$ and $k=1, \ldots, n_j$ and $q_j^* = \tilde{T}_j^{-1}(q_j)$.

Thus, for $j=1, \ldots, N$, the result $q_j$ is effectively calculated as:

$$\begin{aligned} q_j &= \tilde{T}_j(q_j^*) \\ &= \tilde{T}_j\left(F_j^*\left(p_{\beta_{j,1}}^*, \ldots, p_{\beta_{j,n_j}}^*\right)\right) \\ &= \tilde{T}_j\left(F_j^*\left(T_{j,1}(p_{\beta_{j,1}}), \ldots, T_{j,n_j}(p_{\beta_{j,n_j}})\right)\right) \end{aligned}$$

The transformed version $F_j^*$ of the function $F_j$ may be determined at the time that the transforms $T_{j,1}, \ldots, T_{j,n_j}$ and $\tilde{T}_j$ are determined/set, so that the transformed version $F_j^*$ is then ready for subsequent use when carrying out the method 800.

Note that in some embodiments of the invention, the step 302 is optional in the method 800. In particular, when an entity or a module performs or implements the function F, that entity or module may receive or obtain the set of values $\{p_1, \ldots, p_M\}$ instead of receiving or obtaining the set of inputs $\{x_1, \ldots, x_W\}$ at the step 302. For example, a first entity or module may perform or implement the function F in an obfuscated manner as set out above, and a second entity or module may be arranged to determine the set of values $\{p_1, \ldots, p_M\}$ from the set of inputs $\{x_1, \ldots, x_W\}$ and then provide the set of values $\{p_1, \ldots, p_M\}$ to the first entity or module. In such cases, the first entity or module performs the method 800 without the optional step 302.

Additionally, the step 304 is optional in the method 800. In particular, when an entity or a module performs or implements the function F, that entity or module may receive or obtain the set of transformed values $\{p_{\beta_{j,k}}^*: j=1, \ldots, M$ and $k=1, \ldots, n_j\}$ instead of receiving or obtaining the set of values $\{p_1, \ldots, p_M\}$ at the step 304. For example, a first entity or module may perform or implement the function F in an obfuscated manner as set out above, and a second entity or module may be arranged to determine the set of transformed values $\{p_{\beta_{j,k}}^*: j=1, \ldots, M$ and $k=1, \ldots, n_j\}$ and provide this set to the first entity or module. In such cases, the first entity or module performs the method 800 without the optional steps 302 and 304.

This can arise in a number of ways. For example, the second entity or module may obtain the set of inputs $\{x_1, \ldots, x_W\}$ and derive the set of values $\{p_1, \ldots, p_M\}$ (or may simply obtain the set of values $\{p_1, \ldots, p_M\}$) and may then determine the set of transformed values $\{p_{\beta_{j,k}}^*: j=1, \ldots, M$ and $k=1, \ldots, n_j\}$ and provide this set of transformed values to the first entity or module. Alternatively, the original set of values $\{p_1, \ldots, p_M\}$ may, itself, never have been obtained. For example, suppose that the intention is to perform the function $H = F \circ G$, so that $H(x) = F(G(x))$. Then both the function G and the function F can be implemented using embodiments of the invention. When implementing the function G, a set of transformed results will be produced (at the step 804 for the function G). One or more of these transformed results could then be used in the set of transformed values for the function F—thus, the step 804 for the function G may form part of the step 802 for the function F (without needing to perform the steps 302 and 304 for the function F).

Similarly in some embodiments of the invention, the step 308 is optional in the method 800. In particular, when an entity or a module performs or implements the function F, that entity or module may simply output the set of results $\{q_1, \ldots, q_N\}$ instead of outputting the set of outputs $\{y_1, \ldots, y_W\}$ at the step 308. For example, a first entity or module may perform or implement the function F in an obfuscated manner as set out above, and a second entity or module may be arranged to determine the set of outputs $\{y_1, \ldots, y_W\}$ from the set of results $\{q_1, \ldots, q_N\}$ provided by the first entity or module. In such cases, the first entity or module performs the method 800 without the optional step 308.

Additionally, the step 806 is optional in the method 800. In particular, when an entity or a module performs or implements the function F, that entity or module may output the set of transformed results $\{q_1^*, \ldots, q_N^*\}$. For example, a first entity or module may perform or implement the function F in an obfuscated manner as set out above and provide the set of transformed results $\{q_1^*, \ldots, q_N^*\}$ to a second entity or module that may be arranged to determine the set of outputs $\{y_1, \ldots, y_W\}$ from the set of transformed results $\{q_1^*, \ldots, q_N^*\}$ itself. In such cases, the first entity or module performs the method 800 without the optional steps 806 and 308.

Indeed, the set of outputs $\{y_1, \ldots, y_N\}$ and, indeed, the set of results $\{q_1, \ldots, q_N\}$, need not necessarily be derived or obtained. For example, suppose that the intention is to perform the function $H=G \circ F$., so that $H(x)=G(F(x))$. Then both the function G and the function F can be implemented using embodiments of the invention. When implementing the function F, a set of transformed results will be produced (at the step 804 for the function F). One or more of these transformed results could then be used in the set of transformed values for the function G. Thus, the set of transformed results generated when implementing the function F may be used directly as inputs to the function G without deriving the corresponding set of results and/or set of outputs for the function F—i.e., the step 804 for the function F may form part of the step 802 for the function G (without needing to perform the steps 806 and 308 for the function F).

As can be seen from the above, embodiments of the invention make use of the synergy between (a) having the values $p_j$ (j=1, ..., M) dependent on multiple inputs $x_i$ and (b) using transformed versions $F_j^*$ of the sub-functions $F_j$ (j=1, ..., N). In particular, suppose that the function F were a function that generates output $y_i$ based on input $x_i$, so that $y_i=F(x_i)$. It would have been possible to implement the function F as a transformed function F* as set out above. However, in doing so, each input $x_i$ in the set of inputs $\{x_1, \ldots, x_W\}$ would have been processed separately (e.g. a transformed output $y_i^*$ would have been generated as $y_i^*=F^*(x_i^*)$, i.e. as a function of a transformed input $x_i^*$ for i=1, ..., W). Such separate processing makes the task of an attacker easier, where the attacker wishes to determine the input $x_i$ and/or the output $y_i$ and/or one or more secret values used by the function F (e.g. a cryptographic key). For example, calculation of the values $x_i^*$ as set out above could be implemented via a loop, such as:

```
For i = 1 to W
    y_i* = F*(x_i*)
Next i
```

The presence of such loops is detectable by, and exploitable by attackers. In contrast, as embodiments of the invention are based around operations on values $p_j$ (that inherently are each dependent on multiple inputs $x_i$), the task of the attacker is made harder. For example, looped processing (as set out above) can be avoided or minimized, making it harder for an attacker to be successful in their attack.

What is more, efficiency gains can be achieved, as multiple outputs are effectively determined at the same time. In particular, having the values $p_j$ (j=1, ..., M) dependent on multiple inputs $x_i$, the full bit-width of the processing system can be leveraged. For example, if the inputs $x_i$ are 8-bit values and the processor is a 32-bit processor, then each value $p_j$ could (for example) be made up of 4 different inputs), thereby making better use of the processor's capabilities. This helps mitigate the performance loss sometime experienced when performing obfuscation using transforms as set out in section 3 above.

5—Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, smartcard, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of obfuscated performance of a predetermined function in a computing environment, wherein the predetermined function is arranged to operate on a set of one or more operands, wherein for the predetermined function there is one or more corresponding first functions so that, for a set of inputs comprising a plurality of inputs for the predetermined function wherein the set of inputs represents at least one instance of said set of one or more operands and each input is an operand for the predetermined function, a corresponding set of outputs is generatable by (a) representing the set of inputs as a corresponding set of values comprising a plurality of values, wherein each value comprises a part of each input of a corresponding plurality of inputs in the set of inputs, (b) generating a set of one or more results from the corresponding set of values, where each result is generated by applying a corresponding first function to a corresponding set of one or more values in the corresponding set of values, and (c) forming each output as either a part of a corresponding one of the results of the set of one or more results or as a combination of at least part of each result of a corresponding plurality of the set of one or more results;

wherein the method comprises:

obtaining, for each value in the corresponding set of values, one or more corresponding transformed versions of said value, wherein each transformed version of said value is a result of applying a respective bijection, that corresponds to said transformed version, to said value; and generating, by at least one computing device, a set of transformed results corresponding to the set of results, wherein each transformed result corresponds to a respective result and is generated by applying a respective second function, that corresponds to the first function that corresponds to the respective result, to a transformed version of the one or more values in the set of one or more values corresponding to the first function, wherein, for the respective second function, there is a corresponding bijection for obtaining the respective result from said transformed result.

2. The method of claim 1, wherein said obtaining comprises:

obtaining the corresponding set of values; and generating, for each value in the obtained corresponding set of values, said one or more corresponding transformed versions of said value, wherein each of said one or more corresponding transformed versions of said value is generated by applying said respective bijection, that corresponds to said transformed version, to said value.

3. The method of claim 2, wherein obtaining the corresponding set of values comprises:

obtaining the set of inputs; and generating the corresponding set of values from the set of inputs.

4. The method of claim 1, wherein said obtaining comprises receiving, at a first module that performs said obtaining and said generating, said one or more transformed versions of each value in said corresponding set of values from a second module.

5. The method of claim 1, comprising:

generating the set of results from the set of transformed results by applying, to each transformed result, the bijection that corresponds to the second function for that transformed result.

6. The method of claim 5, comprising: obtaining the corresponding set of outputs from the set of results.

7. The method of claim 1, comprising outputting the set of transformed results, from a first module that performs said obtaining and said generating to a second module.

8. The method of claim 1, wherein for each value in the corresponding set of values, the at least part of each input of a corresponding plurality of the inputs comprises all of each input of the corresponding plurality of inputs.

9. The method of claim 1, wherein for each value in the corresponding set of values, the at least part of each input of a corresponding plurality of the inputs comprises a predetermined number of bits of each input of the corresponding plurality of inputs.

10. The method of claim 9, wherein the predetermined number is 1.

11. The method of claim 1, wherein the predetermined function corresponds to a lookup table that maps an input in the set of inputs to a corresponding output in the set of outputs.

12. A method of configuring a computer hardware processor to implement a predetermined function in an obfuscated manner, wherein the predetermined function is arranged to operate on a set of one or more operands, wherein for the predetermined function there is one or more corresponding first functions so that, for a set of inputs comprising a plurality of inputs for the predetermined function wherein the set of inputs represents at least one instance of said set of one or more operands and each input is an operand for the predetermined function, a corresponding set of outputs is generatable by (a) representing the set of inputs as a corresponding set of values comprising a plurality of values, wherein each value comprises a part of each input of a corresponding plurality of inputs in the set of inputs, (b) generating a set of one or more results from the corresponding set of values, where each result is generated by applying a corresponding first function to a corresponding set of one or more values in the corresponding set of values, and (c) forming each output as either a part of a corresponding one of the results of the set of one or more results or as a combination of at least part of each result of a corresponding plurality of the set of one or more results;

wherein the method comprises: for each first function:

specifying, for each value in the corresponding set of one or more values for the first function, a corresponding bijection;

specifying a bijection for the first function; and based on the specified bijections, determining a second function that corresponds to the first function, wherein the second function, upon application to the one or more values of the respective set of one or more values for the first function when transformed under their corresponding bijections, outputs a transformed version, under the bijection for the first function, of the result corresponding to the first function; and configuring the processor to:
obtain, for each value in the corresponding set of values, one or more corresponding transformed versions of said value, wherein each transformed version of said value is a result of applying the bijection, that corresponds to said value in the corresponding set of values, to said value; and
generate a set of transformed results corresponding to the set of results, wherein each transformed result corresponds to a respective result and is generated by applying the respective second function, that corresponds to the first function that corresponds to the respective result, to a transformed version of the one or more values in the set of one or more values corresponding to the first function.

13. An apparatus comprising one or more computer hardware processors that are arranged to carry out obfuscated performance of a predetermined function, wherein the predetermined function is arranged to operate on a set of one or more operands, wherein for the predetermined function there is one or more corresponding first functions so that, for a set of inputs comprising a plurality of inputs for the predetermined function wherein the set of inputs represents at least one instance of said set of one or more operands and each input is an operand for the predetermined function, a corresponding set of outputs is generatable by (a) representing the set of inputs as a corresponding set of values comprising a plurality of values, wherein each value comprises a part of each input of a corresponding plurality of inputs in the set of inputs, (b) generating a set of one or more results from the corresponding set of values, where each result is generated by applying a corresponding first function to a corresponding set of one or more values in the corresponding set of values, and (c) forming each output as either a part of a corresponding one of the results of the set of one or more results or as a combination of at least part of each result of a corresponding plurality of the set of one or more results;
wherein the obfuscated performance of a predetermined function comprises:
obtaining, for each value in the corresponding set of values, one or more corresponding transformed versions of said value, wherein each transformed version of said value is a result of applying a respective bijection, that corresponds to said transformed version, to said value; and
generating a set of transformed results corresponding to the set of results, wherein each transformed result corresponds to a respective result and is generated by applying a respective second function, that corresponds to the first function that corresponds to the respective result, to a transformed version of the one or more values in the set of one or more values corresponding to the first function, wherein, for the respective second function, there is a corresponding bijection for obtaining the respective result from said transformed result.

14. A non-transitory computer-readable medium storing a computer program that, when executed by one or more processors, causes the one or more processors to carry out obfuscated performance of a predetermined function, wherein the predetermined function is arranged to operate on a set of one or more operands, wherein for the predetermined function there is one or more corresponding first functions so that, for a set of inputs comprising a plurality of inputs for the predetermined function wherein the set of inputs represents at least one instance of said set of one or more operands and each input is an operand for the predetermined function, a corresponding set of outputs is generatable by (a) representing the set of inputs as a corresponding set of values comprising a plurality of values, wherein each value comprises a part of each input of a corresponding plurality of inputs in the set of inputs, (b) generating a set of one or more results from the corresponding set of values, where each result is generated by applying a corresponding first function to a corresponding set of one or more values in the corresponding set of values, and (c) forming each output as either a part of a corresponding one of the results of the set of one or more results or as a combination of at least part of each result of a corresponding plurality of the set of one or more results; wherein the obfuscated performance of the predetermined function comprises:
obtaining, for each value in the corresponding set of values, one or more corresponding transformed versions of said value, wherein each transformed version of said value is a result of applying a respective bijection, that corresponds to said transformed version, to said value; and
generating a set of transformed results corresponding to the set of results, wherein each transformed result corresponds to a respective result and is generated by applying a respective second function, that corresponds to the first function that corresponds to the respective result, to a transformed version of the one or more values in the set of one or more values corresponding to the first function, wherein, for the respective second function, there is a corresponding bijection for obtaining the respective result from said transformed result.

\* \* \* \* \*